US012706079B2

(12) United States Patent
Zhang et al.

(10) Patent No.: US 12,706,079 B2
(45) Date of Patent: Aug. 11, 2026

(54) ARTIFICIAL INTELLIGENCE-BASED AUDIO SIGNAL GENERATION METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Zewang Zhang, Shenzhen (CN); Qiao Tian, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 664 days.

(21) Appl. No.: 18/077,623

(22) Filed: Dec. 8, 2022

(65) Prior Publication Data

US 2023/0122659 A1 Apr. 20, 2023

Related U.S. Application Data

(63) Continuation of application No. PCT/CN2021/135003, filed on Dec. 2, 2021.

(30) Foreign Application Priority Data

Dec. 23, 2020 (CN) ......................... 202011535400.4

(51) Int. Cl.
*G10L 13/02* (2013.01)
*G10L 25/30* (2013.01)

(52) U.S. Cl.
CPC .............. *G10L 13/02* (2013.01); *G10L 25/30* (2013.01)

(58) Field of Classification Search
CPC ....... G10L 13/02; G10L 25/30; G10L 13/047; G10L 13/04; G10L 13/08
See application file for complete search history.

(56) References Cited

U.S. PATENT DOCUMENTS

2019/0130271 A1* 5/2019 Narang .................. G06N 3/044
2020/0051583 A1* 2/2020 Wu ........................ G06N 5/046
(Continued)

FOREIGN PATENT DOCUMENTS

CN 111754976 A 10/2020
CN 111816158 A 10/2020
(Continued)

OTHER PUBLICATIONS

Tian, Qiao, et al. "Feathertts: Robust and efficient attention based neural tts." arXiv preprint arXiv:2011.00935 (2020). (Year: 2020).*
(Continued)

*Primary Examiner* — Bhavesh M Mehta
*Assistant Examiner* — Jangwoen Lee
(74) *Attorney, Agent, or Firm* — Anova Law Group, PLLC

(57) ABSTRACT

An artificial intelligence (AI)-based audio signal generation method includes: converting a text into a corresponding phoneme sequence; encoding the phoneme sequence to obtain a contextual representation of the phoneme sequence; determining, based on a first frame hidden state corresponding to a phoneme in the phoneme sequence, an alignment position of the first frame hidden state relative to the contextual representation; decoding the contextual representation and the first frame hidden state to obtain a second frame hidden state when the alignment position corresponds to a non-end position in the contextual representation; and synthesizing the first frame hidden state and the second frame hidden state to obtain an audio signal corresponding to a text.

20 Claims, 8 Drawing Sheets

(56) References Cited

U.S. PATENT DOCUMENTS

| | | | | |
|---|---|---|---|---|
| 2022/0238116 | A1* | 7/2022 | Gao | G10L 17/02 |
| 2022/0270587 | A1* | 8/2022 | Wu | G10L 25/18 |
| 2023/0009613 | A1* | 1/2023 | Rosenberg | G06N 3/082 |

FOREIGN PATENT DOCUMENTS

| | | | |
|---|---|---|---|
| CN | 111968618 | A | 11/2020 |
| CN | 113409757 | A | 9/2021 |

OTHER PUBLICATIONS

The World Intellectual Property Organization (WIPO) International Search Report for PCT/CN2021/135003 Mar. 3, 2022 8 Pages (including translation).

Qiao Tian et al., "Feathertts: Robust and Efficient Attention Based Neural TTS", Nov. 2, 2020, arXiv: 2011.00935v1.

Yuxuan Wang et al., "Tacotron: Towards End-To-End Speech Synthesis", 2017, Interspeech.

Jonathan Shen et al., "Natural TTS Synthesis By Conditioning Wavenet On MEL Spectrogram Predictions", 2017, p. 4779-4783, 2018 IEEE International Conference on Acoustics, Speech and Signal Processing (ICASSP).

Eric Battenberg et al., "Location-Relative Attention Mechanisms for Robust Long-Form Speech Synthesis", 2020, ICASSP 2020-2020 IEEE International Conference on Acoustics, Speech and Signal Processing (ICASSP).

Alex Graves et al., "Generating Sequences With Recurrent Neural Networks", 2013, arXiv preprint arXiv:1308.0850.

Zewang Zhang et al., "AdaDurIAN: Few-shot Adaptation for Neural Text-to-Speech with DurIAN", 2020, arXiv preprint arXiv:2005.05642.

* cited by examiner

ARTIFICIAL INTELLIGENCE-BASED AUDIO SIGNAL GENERATION METHOD AND APPARATUS, DEVICE, AND STORAGE MEDIUM

CROSS-REFERENCES TO RELATED APPLICATIONS

This application is a continuation application of PCT Patent Application No. PCT/CN2021/135003, entitled "ARTIFICIAL INTELLIGENCE-BASED AUDIO SIGNAL GENERATION METHOD, APPARATUS, DEVICE, STORAGE MEDIUM, AND COMPUTER PROGRAM PRODUCT" and filed on Dec. 2, 2021, which claims priority to Chinese Patent Application No. 202011535400.4 filed on Dec. 23, 2020, the entire contents of both of which are incorporated herein by reference.

FIELD OF THE TECHNOLOGY

The present disclosure relates to artificial intelligence (AI) technology, and in particular, to an AI-based audio signal generation method and apparatus, an electronic device, a computer-readable storage medium, and a computer program product.

BACKGROUND OF THE DISCLOSURE

AI is a comprehensive computer science and technology, which studies design principles and implementation methods of various intelligent machines, to enable the machines to have functions of perception, reasoning, and decision-making. AI technology is a comprehensive discipline that covers a wide range of fields, such as natural language processing technology and machine learning/deep learning. With the development of technology, AI technology will be applied to more fields and play an increasingly important role.

In the related technology, the audio synthesis method is relatively rough, which usually directly combine a frequency spectrum corresponding to text data to obtain an audio signal corresponding to the text data. Such a synthesis method can often cause problems of word missing and repeated word reading, which cannot accurately perform audio decoding and cannot realize accurate audio synthesis.

SUMMARY

Embodiments of the present disclosure provide an AI-based audio signal generation method and apparatus, an electronic device, a computer-readable storage medium, and a computer program product, which can improve the accuracy of audio synthesis.

The technical solutions of the embodiments of the present disclosure are implemented as follows:

The embodiments of the present disclosure provide an AI-based audio signal generation method, which includes: converting a text into a corresponding phoneme sequence; encoding the phoneme sequence to obtain a contextual representation of the phoneme sequence; determining, based on a first frame hidden state corresponding to a phoneme in the phoneme sequence, an alignment position of the first frame hidden state relative to the contextual representation; decoding the contextual representation and the first frame hidden state to obtain a second frame hidden state when the alignment position corresponds to a non-end position in the contextual representation; and synthesizing the first frame hidden state and the second frame hidden state to obtain an audio signal corresponding to the text.

The embodiments of the present disclosure also provide an audio signal generation apparatus, which includes: an encoding module, configured to convert a text into a corresponding phoneme sequence; and encode the phoneme sequence to obtain a contextual representation of the phoneme sequence; an attention module, configured to determine, based on a first frame hidden state corresponding to a phoneme in the phoneme sequence, an alignment position of the first frame hidden state relative to the contextual representation; a decoding module, configured to decode the contextual representation and the first frame hidden state to obtain a second frame hidden state when the alignment position corresponds to a non-end position in the contextual representation; and a synthesis module, configured to synthesize the first frame hidden state and the second frame hidden state to obtain an audio signal corresponding to the text.

The embodiments of the present disclosure also provide an electronic device for audio signal generation, which includes: a memory, configured to store executable instructions; and a processor, configured to implement the AI-based audio signal generation method provided by the embodiments of the present disclosure when executing the executable instructions stored in the memory.

An embodiment of the present disclosure provides a non-transitory computer-readable storage medium storing executable instructions, the executable instructions, when executed by a processor, implementing the AI-based audio signal generation method provided by the embodiments of the present disclosure.

This embodiment of the present disclosure has the following beneficial effects:

By determining an alignment position of a hidden state relative to a contextual representation and performing subsequent decoding based on an accurate alignment position, an accurate audio signal can be synthesized based on an accurate hidden state.

DESCRIPTION OF EMBODIMENTS

Figure 1:
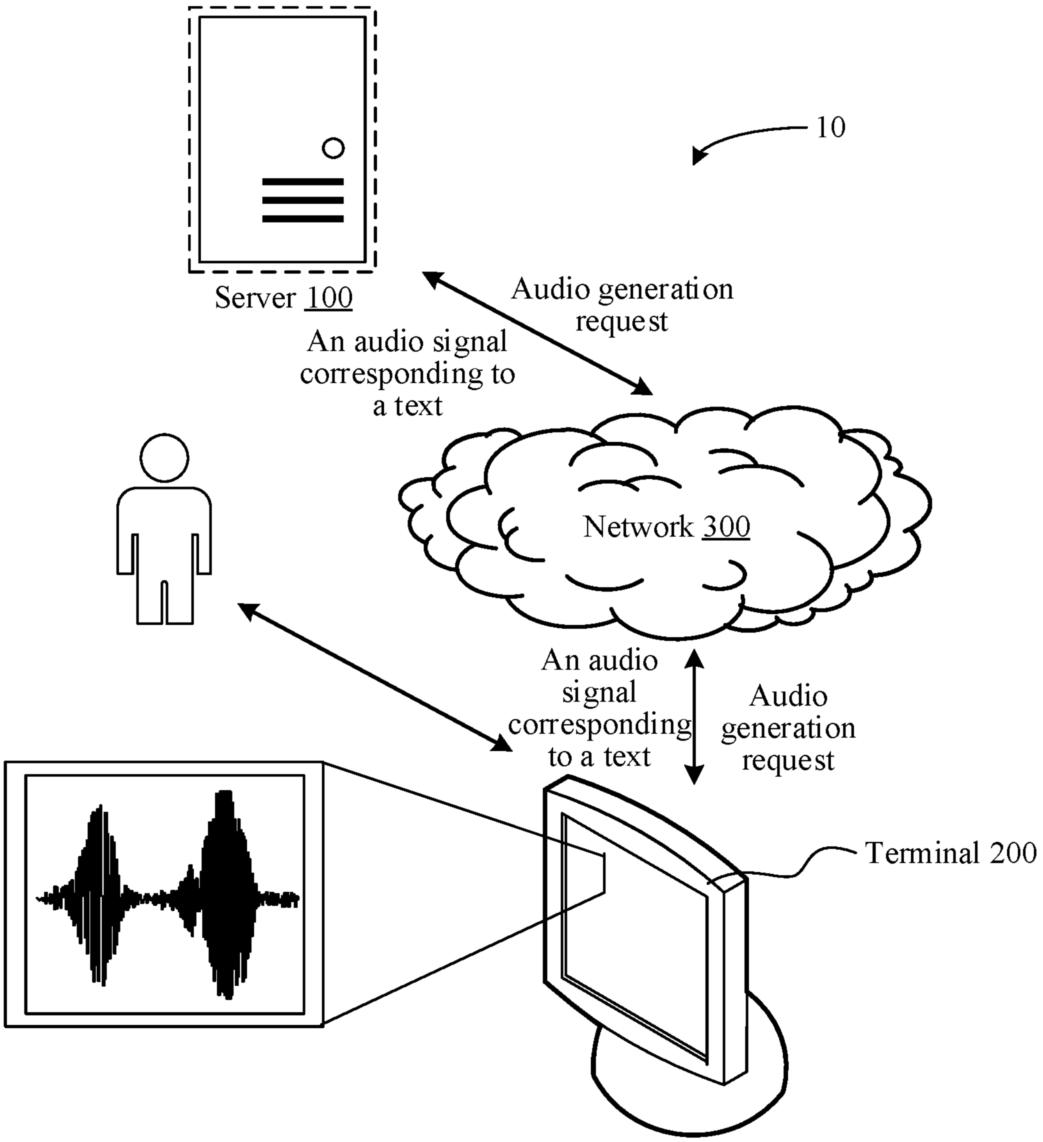
FIG. 1 is a schematic diagram of an application scenario of an audio signal generation system according to an embodiment of the present disclosure.

To make the objectives, technical solutions, and advantages of the present disclosure clearer, the following describes the present disclosure in further detail with reference to the accompanying drawings. The described embodiments are not to be considered as a limitation to the present disclosure. All other embodiments obtained by a person of ordinary skill in the art without creative efforts shall fall within the protection scope of the present disclosure.

In the following descriptions, the comprised term "first/second" is merely intended to distinguish similar objects but does not necessarily indicate a specific order of an object. It may be understood that "first/second" is interchangeable in terms of a specific order or sequence if permitted, so that the embodiments of the present disclosure described herein can be implemented in a sequence in addition to the sequence shown or described herein.

Unless otherwise defined, meanings of all technical and scientific terms used in this specification are the same as those usually understood by a person skilled in the art to which the present disclosure belongs. Terms used in this specification are merely intended to describe objectives of the embodiments of the present disclosure, but are not intended to limit the present disclosure.

Before the embodiments of the present disclosure are further described in detail, nouns and terms involved in the embodiments of the present disclosure are described. The nouns and terms provided in the embodiments of the present disclosure are applicable to the following explanations.

1) Convolutional neural networks (CNNs): a class of feedforward neural networks (FNNs) that contain convolution calculation and have a deep structure, and are one of representative algorithms of deep learning. CNNs have the representation learning ability and can perform shift-invariant classification on an inputted image according to a hierarchical structure of CNNs.

2) Recurrent neural networks (RNNs): a class of recursive neural networks in which sequence data is used as an input, recursion is performed in a sequence evolution direction, and all nodes (recursive units) are in a chain connection. RNNs have memory, parameter sharing, and Turing completeness, so they have certain advantages in learning nonlinear features of sequences.

3) Phoneme: the smallest basic unit of sound, and the basis of human ability to distinguish one word from another. Phonemes form a syllable, and syllables form different words and phrases.

4) Hidden state: a sequence outputted by a decoder (e.g. a hidden Markov model) and used for representing frequency spectrum data that can be obtained by smoothing a corresponding hidden state. An audio signal is a non-stationary signal over a long period of time (e.g. more than 1s), but is approximate to a stationary signal over a short period of time (e.g. 50 ms). A stationary signal has the features of stable frequency spectrum distribution and similar frequency spectrum distribution over different periods of time. A hidden Markov model classifies continuous signals corresponding to similar small frequency spectrum segments into a hidden state that is a state actually hidden in a Markov model, cannot be directly observed, and is a sequence used for representing frequency spectrum data. The process of training a Markov model is to maximize likelihood, data generated by each hidden state is represented by a probability distribution, and likelihood can be as large as possible only when similar continuous signals are classified into the same hidden state. In the embodiments of the present disclosure, a first frame hidden state represents a hidden state of the first frame, a second frame hidden state represents a hidden state of the second frame, and the first frame and the second frame are any two adjacent frames in frequency spectrum data corresponding to each phoneme.

5) Contextual representation: a vector sequence outputted by an encoder and used for representing the contextual content of a text.

6) End position: a position after the last data (e.g. a phoneme, a word or a phrase) in a text. For example, there are 5 phonemes in a phoneme sequence corresponding to a certain text, position 0 represents the starting position in the phoneme sequence, position 1 represents a position of the first phoneme in the phoneme sequence, . . . , position 5 represents a position of the fifth phoneme in the phoneme sequence, and position 6 represents the end position in the phoneme sequence. Positions 0 to 5 represent non-end positions in the phoneme sequence.

7) Mean absolute error (MAE): also known as L1 Loss, a mean of distances between values f(x) predicted by a model and true values y.

8) Block sparsity: the processing of dividing a weight into blocks during training, sorting the blocks according to the size of a mean absolute value of parameters in each block during each parameter updating, and resetting a weight on a block with a relatively small absolute value to 0.

9) Synthetic real-time rate: a ratio of 1s of audio to a computer runtime required for synthesizing the 1s of audio. For example, when a computer runtime required for synthesizing 1s of audio is 100 ms, a synthetic real-time rate is 10×.

10) Audio signal: including digital audio signals (also known as audio data) and analog audio signals. During processing of audio data, digitization of voice refers to the process of performing analog-to-digital conversion (ADC) on an inputted analog audio signal to obtain a digital audio signal (audio data), and playing of digital voice refers to the process of performing digital-to-analog conversion (DAC) on a digital audio signal to obtain an analog audio signal and outputting the analog audio signal.

In the related technology, an acoustic model uses a content-based or position-based attention mechanism or a content-and-position-based attention mechanism combined with the stop token mechanism to predict a stop position of audio generation. The related technology has the following problems: 1) alignment error will occur, leading to unbearable problems of word missing and repeated word reading, which makes it difficult to put a speech synthesis system into practical application; 2) early stop of synthesis for long sentences and complex sentences will occur, leading to incomplete audio synthesis; and 3) the speed of training and reasoning is slow, which makes it difficult to deploy Text to Speech (TTS) in edge devices such as mobile phones.

In order to solve the above problems, the embodiments of the present disclosure provide an AI-based audio signal generation method and apparatus, an electronic device, a computer-readable storage medium, and a computer program product, which can improve the accuracy of audio synthesis.

The AI-based audio signal generation method according to the embodiments of the present disclosure can be implemented by a terminal/server alone; or can be implemented by a terminal in cooperation with a server. For example, only a terminal implements an AI-based audio signal generation method to be described below. Or, a terminal transmits an audio generation request (including a text for which audio needs to be generated) to a server, and the server implements the AI-based audio signal generation method according to the received audio generation request, performs, in response to the audio generation request, decoding based on a contextual representation and a first frame hidden state to obtain a second frame hidden state when an alignment position corresponds to a non-end position in the contextual representation, and performs synthesis based on the first frame hidden state and the second frame hidden state to obtain an audio signal corresponding to the text. As a result, intelligent and accurate audio generation is realized.

An electronic device for audio signal generation provided by an embodiment of the present disclosure may be various types of terminal devices or servers. The servers may be independent physical servers, a server cluster or a distributed system including a plurality of physical servers, or a cloud server that provides cloud computing services. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in the present disclosure.

For example, the server may be a server cluster deployed in the cloud to open AI as a Service (AIaaS) to users. An AIaaS platform will split several types of common AI services and provide independent or packaged services in the cloud. Such a service mode is similar to an AI-themed mall, and all users can access and use one or more AI services provided by the AIaaS platform through application programming interfaces (API).

For example, an AIaaS may be an audio signal generation service, that is, an audio signal generation program according to the embodiments of the present disclosure is encapsulated in the server in the cloud. A user invokes an audio signal generation service in the cloud services through the terminal (in which clients, such as a sound client and vehicle client, run). The server deployed in the cloud invokes the encapsulated audio signal generation program to decode a contextual representation and a first frame hidden state so as to obtain a second frame hidden state when an alignment position corresponds to a non-end position in the contextual representation, and synthesize the first frame hidden state and the second frame hidden state so as to obtain an audio signal corresponding to a text.

As an application example, for a sound client, a user may be a broadcaster of a broadcast platform, and needs to regularly broadcast matters needing attention, tips for life, etc. to residents in a community. For example, the broadcaster enters a text in the sound client, the text is converted into audio, and the audio is broadcast to the residents in the community. During conversion of the text into audio, an alignment position of a hidden state relative to a contextual representation of a phoneme sequence corresponding to the text is continuously determined, subsequent decoding is performed based on an accurate alignment position, an accurate audio signal is generated based on an accurate hidden state, and audio is broadcast to the residents.

As another application example, for a vehicle client, it is inconvenient for a user to acquire information from a text when driving, but the user can acquire information from audio to avoid missing important information. For example, a superior sends a text of an important meeting to the user when the user is driving, the user needs to read and process the text timely, and the vehicle client needs to convert the text into audio after receiving the text and play the audio for the user. During conversion of the text into audio, an alignment position of a hidden state relative to a contextual representation of a phoneme sequence corresponding to the text is continuously determined, subsequent decoding is performed based on an accurate alignment position, and an accurate audio signal is generated based on an accurate hidden state, and generated audio is played for the user. As a result, the user can listen to the audio timely.

As another application example, for a question raised by a user, an intelligent voice assistant searches out a corresponding answer in text form and outputs the answer through audio. For example, a user asks about the weather of the day, the intelligent voice assistant invokes a search engine to search for a weather forecast text of the weather of the day, coverts the weather forecast text into audio by the AI-based audio signal generation method according to the embodiments of the present disclosure, and plays the audio so as to realize the accurate audio signal generation to play generated audio to the user. As a result, the user can acquire an accurate weather forecast timely.

Referring to FIG. 1, which is a schematic diagram of an application scenario of an audio signal generation system 10 according to an embodiment of the present disclosure, a terminal 200 is connected to a server 100 through a network 300. The network 300 may be a wide area network or a local area network, or a combination thereof.

The terminal 200 (in which clients, such as a sound client and a vehicle client, run) can be configured to acquire an audio generation request. For example, a user enters a text for which audio needs to be generated in the terminal 200, and the terminal 200 automatically acquires the text for which audio needs to be generated, and automatically generates an audio generation request.

In some embodiments, a client running in the terminal can be implanted with an audio signal generation plug-in that is used for implementing an AI-based audio signal generation method locally. For example, after acquiring an audio generation request (including a text for which audio needs to be generated), the terminal 200 invokes the audio signal generation plug-in to implement the AI-based audio signal generation method, and the audio signal generation plug-in decodes a contextual representation and a first frame hidden state to obtain a second frame hidden state when an alignment position corresponds to a non-end position in the contextual representation, and synthesizes the first frame hidden state and the second frame hidden state to obtain an audio signal corresponding to the text. In such a way, intelligent and accurate audio synthesis can be realized. For example, for a recording tool that cannot realize high-quality personalized voice customization for users in non-studio scenarios, a user enters a text to be recorded in a recording client, and the text needs to be converted into personalized audio. During conversion of the text into audio, an alignment position of a hidden state relative to a contextual representation of a phoneme sequence corresponding to the text is continuously determined, subsequent decoding is performed based on an accurate alignment position, and accurate personalized audio is generated based on an accurate hidden state. As a result, personalized voice customization is realized in non-studio scenarios.

In some embodiments, after acquiring an audio generation request, the terminal 200 invokes an audio signal generation interface (can be provided as a cloud service, that is, an audio signal generation service) of the server 100. The server 100 decodes a contextual representation and a first frame hidden state to obtain a second frame hidden state when an alignment position corresponds to a non-end position in the contextual representation, synthesizes the first frame hidden state and the second frame hidden state to obtain an audio signal corresponding to the text, and transmits the audio signal to the terminal 200. For example, for a recording tool that cannot realize high-quality personalized voice customization for users in non-studio scenarios, a user enters a text to be recorded in the terminal 200, and the terminal 200 automatically generates an audio generation request and transmits the audio generation request to the server 100. During conversion of the text into audio, the server 100 continuously determines an alignment position of a hidden state relative to a contextual representation of a phoneme sequence corresponding to the text, performs subsequent decoding based on an accurate alignment position, generates accurate personalized audio based on an accurate hidden state, and transmits, in response to the audio generation request, the generated personalized audio to the terminal 200. As a result, personalized voice customization is realized in non-studio scenarios.

A structure of an electronic device for audio signal generation according to the embodiments of the present disclosure will be described below with reference to FIG. 2, which is a schematic structural diagram of an electronic device 500 for audio signal generation according to an embodiment of the present disclosure. The description is made by taking the electronic device 500 being a server as an example, and the electronic device 500 for audio signal generation shown in FIG. 2 includes at least one processor 510, a memory 550, at least one network interface 520, and at least one user interface 530. All the components in the electronic device 500 are coupled together by using a bus system 540. It may be understood that the bus system 540 is configured to implement connection and communication between the components. In addition to a data bus, the bus system 540 further includes a power bus, a control bus, and a state signal bus. However, for ease of clear description, all types of buses are marked as the bus system 540 in FIG. 2.

The processor 510 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor or the like.

The memory 550 includes a volatile memory or a non-volatile memory, or may include both a volatile memory and a non-volatile memory. The non-volatile memory may be a read-only memory (ROM), and the volatile memory may be a random access memory (RAM). The memory 550 described in this embodiment of the present disclosure is to include any other suitable type of memories. The memory 550 includes one or more storage devices that are physically remote from the processor 510.

In some embodiments, the memory 550 may store data to support various operations. Examples of the data include a program, a module, and a data structure a subset or a superset thereof, which are described below by using examples.

An operating system 551 includes a system program configured to process various basic system services and perform a hardware-related task, such as a framework layer, a core library layer, or a driver layer, and is configured to implement various basic services and process a hardware-based task.

A network communication module 552 is configured to access other computing devices via one or more (wired or wireless) network interfaces 520, exemplary network interfaces 520 including: Bluetooth, Wireless Fidelity (WiFi), Universal Serial Bus (USB), etc.

In some embodiments, the audio signal generation apparatus according to the embodiments of the present disclosure can be implemented as software, such as the above audio signal generation plug-in in the terminal or the above audio signal generation service in the server. Of course, the audio signal generation apparatus is not limited to the above, and can be provided as various software embodiments, which include an application program, software, a software module, a script, and codes.

Figure 2:
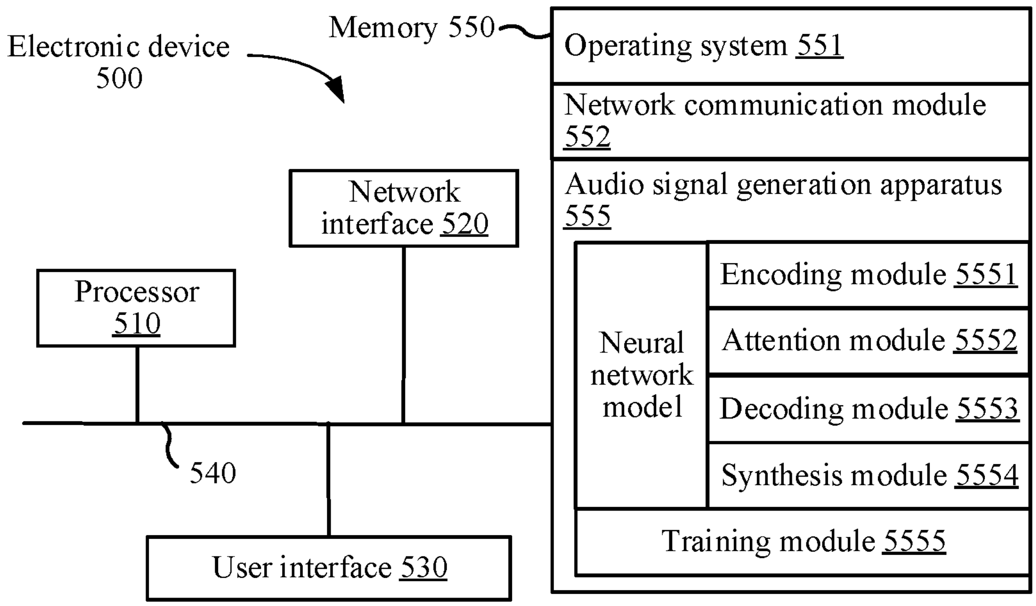
FIG. 2 is a schematic structural diagram of an electronic device for audio signal generation according to an embodiment of the present disclosure.

FIG. 2 shows an audio signal generation apparatus 555 stored in the memory 550, which may be software in the form of programs and plug-in such as an audio signal generation plug-in, and includes a series of modules: an encoding module 5551, an attention module 5552, a decoding module 5553, a synthesis module 5554, and a training module 5555. The encoding module 5551, the attention module 5552, the decoding module 5553, and the synthesis module 5554 are configured to implement the audio signal generation method according to the embodiments of the present disclosure, and the training module 5555 is configured to train a neural network model. The audio signal generation method is implemented by invoking the neural network model.

Figure 3:
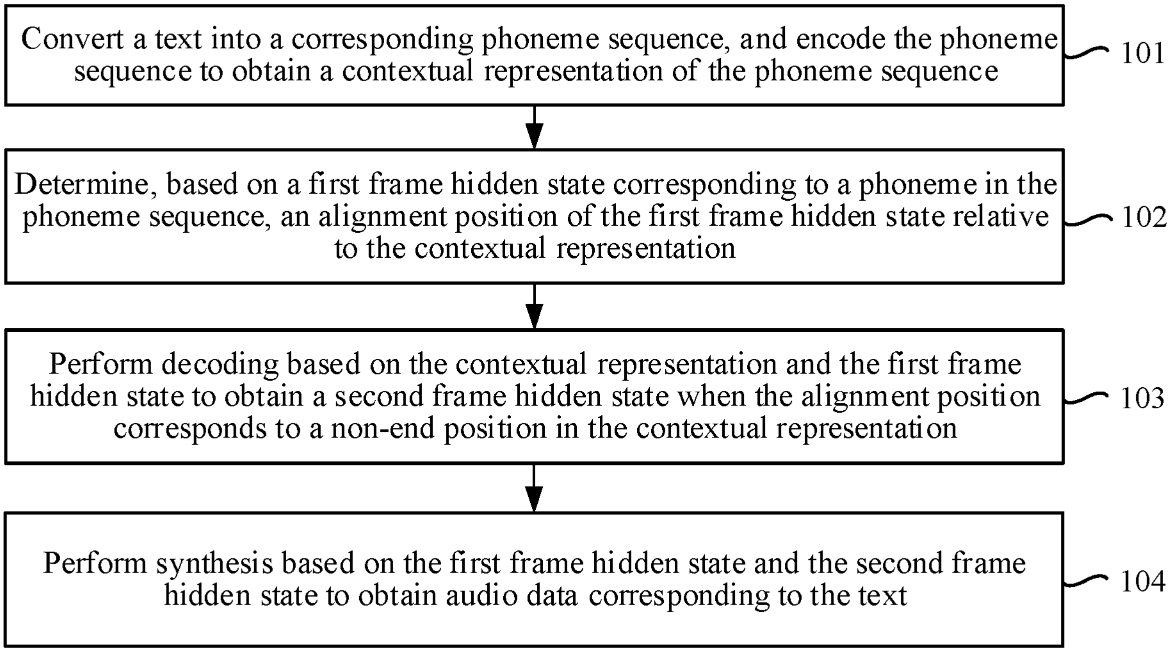
FIG. 3 to FIG. 5 are schematic flowcharts of AI-based audio signal generation methods according to embodiments of the present disclosure.

As described above, the AI-based audio signal generation method according to the embodiments of the present disclosure can be implemented by using variety types of electronic devices. FIG. 3 is a schematic flowchart of an AI-based audio signal generation method according to an embodiment of the present disclosure, and a description will be made below with reference to steps shown in FIG. 3.

At the following steps, a text corresponds to a phoneme sequence, and a phoneme corresponds to multiple frames of frequency spectrum data (i.e. audio data). For example, phoneme A corresponds to 50 ms of frequency spectrum data, and a frame of frequency spectrum data is 10 ms, then phoneme A corresponds to 5 frames of frequency spectrum data.

Step 101. Covert a text into a corresponding phoneme sequence, and encode the phoneme sequence to obtain a contextual representation of the phoneme sequence.

As an example of acquiring a text, a user enters a text for which audio needs to be generated in the terminal, the terminal automatically acquires the text for which audio needs to be generated, automatically generates an audio generation request, and transmits the audio generation request to the server, and the server parses the audio generation request to acquire the text for which audio needs to be generated, and performs preprocessing on the text for which audio needs to be generated to obtain a phoneme sequence corresponding to the text, which is conductive to subsequent encoding that is performed based on the phoneme sequence. For example, a phoneme sequence corresponding to a text of “语音合成” (which means speech synthesis) is “v3 in1 h e2 ch eng2”. A content encoder (a model with contextual correlation) encodes the phoneme sequence to obtain a contextual representation of the phoneme sequence, and the contextual representation outputted by the content encoder has the ability to model the context.

In some embodiments, the operation of encoding the phoneme sequence to obtain a contextual representation of the phoneme sequence includes the operation of: performing forward encoding on the phoneme sequence to obtain a forward hidden vector of the phoneme sequence; performing backward encoding on the phoneme sequence to obtain a backward hidden vector of the phoneme sequence; and fusing the forward hidden vector and the backward hidden vector to obtain a contextual representation of the phoneme sequence.

For example, the phoneme sequence can be inputted into the content encoder (e.g. an RNN and a bidirectional long short-term memory (BLSTM or BiLSTM) network). The content encoder performs forward encoding and backward encoding respectively on the phoneme sequence to obtain a forward hidden vector and a backward hidden vector corresponding to the phoneme sequence, and fuses the forward hidden vector and the backward hidden vector to obtain a contextual representation containing contextual information. The forward hidden vector contains all forward information, and the backward hidden vector contains all backward information. Therefore, the encoded information obtained by fusing the forward hidden vector and the backward hidden vector contains all information of the phoneme sequence, which improves the accuracy of encoding based on the forward hidden vector and the backward hidden vector.

In some embodiments, the operation of performing forward encoding on the phoneme sequence corresponding to the text to obtain a forward hidden vector of the phoneme sequence includes the operation of: encoding, by the encoder, all phonemes in the phoneme sequence corresponding to the text in sequence in a first direction to obtain hidden vectors of all phonemes in the first direction; the operation of performing backward encoding on the phoneme sequence corresponding to the text to obtain a backward hidden vector of the phoneme sequence includes the operation of: encoding, by the encoder, all phonemes in sequence in a second direction to obtain hidden vectors of all phonemes in the second direction; the operation of fusing the forward hidden vector and the backward hidden vector to obtain a contextual representation of the phoneme sequence includes the operation of: concatenating the forward hidden vector and the backward hidden vector to obtain a contextual representation of the phoneme sequence.

Figure 6:
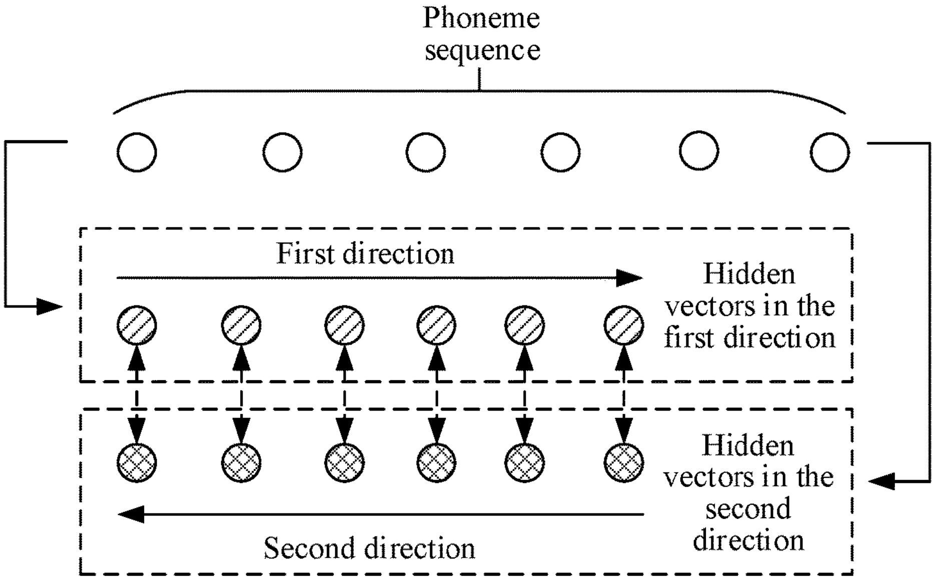
FIG. 6 is a schematic diagram of encoding with a content encoder according to an embodiment of the present disclosure.

As shown in FIG. 6, the second direction is opposite to the first direction, when the first direction refers to a direction from the first phoneme in the phoneme sequence to the last phoneme, the second direction refers to a direction from the last phoneme in the phoneme sequence to the first phoneme; and when the first direction refers to a direction from the last phoneme in the phoneme sequence to the first phoneme, the second direction refers to a direction from the first phoneme in the phoneme sequence to the last phoneme. The content encoder encodes all phonemes in the phoneme sequence in sequence in the first direction and the second direction, respectively, to obtain hidden vectors (i.e., the forward hidden vector) of all phonemes in the first direction and hidden vector (i.e., the backward hidden vector) of all phonemes in the second direction, concatenates the forward hidden vector and backward hidden vector to obtain a contextual representation containing contextual information. The hidden vectors in the first direction contain all information in the first direction, and the hidden vectors in the second direction contain all information in the second direction. Therefore, the encoded information obtained by concatenating the hidden vectors in the first direction and the hidden vectors in the second direction contains all information of the phoneme sequence.

For example, $0<j\leq M$, j and M are both a positive integer, and M is the number of phonemes in the phoneme sequence. When there are M phonemes in the phoneme sequence, the M phonemes are encoded in sequence in the first direction to obtain M hidden vectors in the first direction. For example, the phoneme sequence is encoded in the first direction to obtain hidden vectors $\{h_{1l}, h_{2l}, \ldots h_{jl} \ldots, h_{Ml}\}$ in the first direction, where, $h_{jl}$ represents a $j^{th}$ hidden vector of a $j^{th}$ phoneme in the first direction. The M phonemes are encoded in sequence in the second direction to obtain M hidden vectors in the second direction. For example, the phoneme sequence is encoded in the second direction to obtain hidden vectors $\{h_{1r}, h_{2r}, \ldots h_{jr} \ldots, h_{Mr}\}$ in the second direction, where, $h_{jr}$ represents a $j^{th}$ hidden vector of a $j^{th}$ phoneme in the second direction. The hidden vectors $\{h_{1l}, h_{1l}, \ldots h_{jl} \ldots, h_{Ml}\}$ in the first direction and the hidden vectors $\{h_{1r}, h_{2r}, \ldots h_{jr} \ldots, h_{Mr}\}$ in the second direction are concatenated to obtain a contextual representation $\{[h_{1l}, h_{1r}], [h_{2l}, h_{2r}], \ldots [h_{jl}, h_{jr}] \ldots, [h_{Ml}, h_{Mr}]\}$ containing contextual information. For example, the $j^{th}$ hidden vector $h_{jl}$ of the $j^{th}$ phoneme in the first direction and the $j^{th}$ hidden vector $h_{jr}$ of the $j^{th}$ phoneme in the second direction are concatenated to obtain $i^{th}$ encoded information $\{h_{jl}, h_{jr}\}$ containing contextual information. The last hidden vector in the first direction contains most of the information in the first direction, and the last hidden vector in the second direction contains most of the information in the second direction. In order to save computing time, the last hidden vector in the first direction and the last hidden vector in the second direction are directly fused to obtain a contextual representation containing contextual information.

Step 102. Determine, based on a first frame hidden state corresponding to each phoneme in the phoneme sequence, an alignment position of the first frame hidden state relative to the contextual representation.

Step 103. Decode the contextual representation and the first frame hidden state to obtain a second frame hidden state when the alignment position corresponds to a non-end position in the contextual representation.

Each phoneme corresponds to hidden states of multiple frames. The first frame hidden state represents a hidden state of the first frame, the second frame hidden state represents a hidden state of the second frame, and the first frame and the second frame are any two adjacent frames in the frequency spectrum data corresponding to each phoneme.

Figure 4:
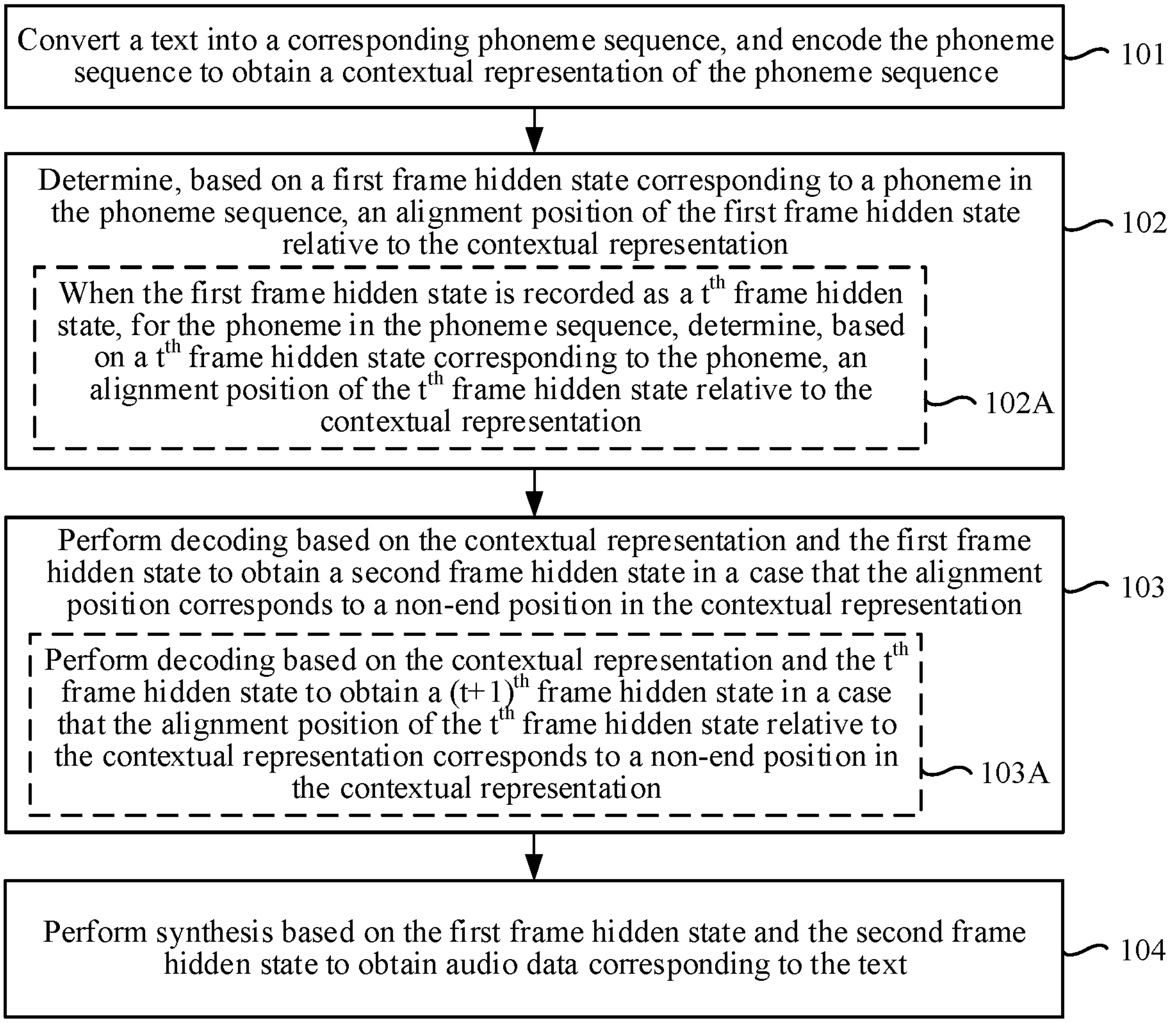

Referring to FIG. 4, which is a schematic flowchart of an AI-based audio signal generation method according to an embodiment of the present disclosure, step 102 in FIG. 3 can be implemented as step 102A in FIG. 4. Step 102A. For a phoneme in the phoneme sequence, determine, based on a $t^{th}$ frame hidden state corresponding to each phoneme, an alignment position of the $t^{th}$ frame hidden state relative to the contextual representation when the first frame hidden state is recorded as a $t^{th}$ frame hidden state (i.e., a hidden state of a $t^{th}$ frame). In some embodiments, the process can be performed for each phoneme in the phoneme sequence. Step 103 can be implemented as step 103A in FIG. 4. Step 103A. Decode the contextual representation and the $t^{th}$ hidden state to obtain a $(t+1)^{th}$ frame hidden state (i.e., a hidden state of a $(t+1)^{th}$ frame) when the alignment position of the $t^{th}$ frame hidden state relative to the contextual representation corresponds to a non-end position in the contextual representation. t is a natural number increasing from 1 and satisfies the condition of $1\leq t\leq T$, T is the total number of frames corresponding to the phoneme sequence when the alignment position corresponds to the end position in the contextual representation, the total number of frames represents the number of frames of frequency spectrum data corresponding to hidden states of phonemes in the phoneme sequence, and T is a natural number greater than or equal to 1.

Figure 7:
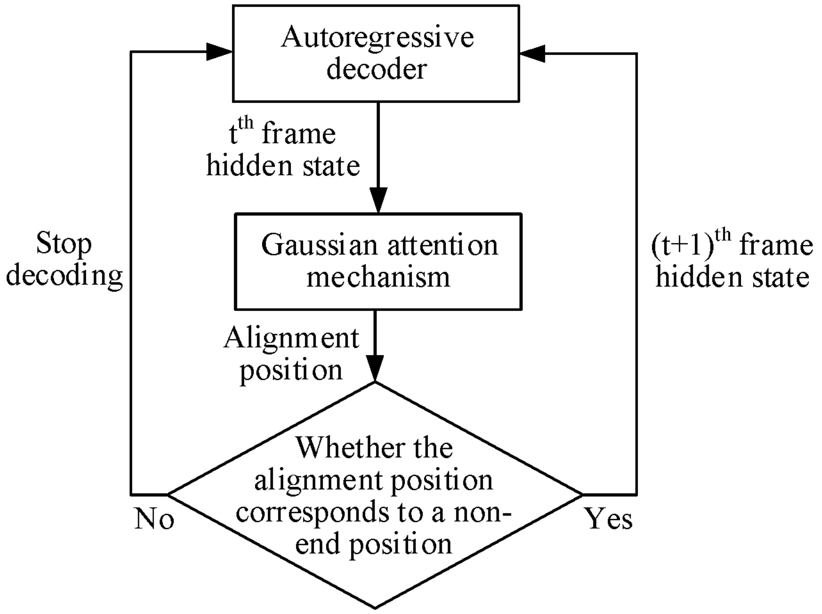
FIG. 7 is a schematic flowchart of an AI-based audio signal generation method according to an embodiment of the present disclosure.

As shown in FIG. 7, the following iterative processing is performed on each phoneme in the phoneme sequence: an autoregressive decoder inputs a $t^{th}$ frame hidden state into a Gaussian attention mechanism, the Gaussian attention mechanism determines, based on the $t^{th}$ frame hidden state, an alignment position of the $t^{th}$ frame hidden state relative to the contextual representation, the autoregressive decoder decodes the contextual representation and the $t^{th}$ frame hidden state when the alignment position of the $t^{th}$ frame hidden state relative to the contextual representation corresponds to a non-end position in the contextual representation to obtain a $(t+1)^{th}$ frame hidden state, and the iterative processing is performed until the alignment position of the hidden state relative to the contextual representation corresponds to the end position in the contextual representation. Therefore, decoding is continuously performed when the hidden state represents a non-end position, which avoids the problem of incomplete audio synthesis caused by word missing or early stop of synthesis, and improves the accuracy of audio synthesis.

Figure 5:
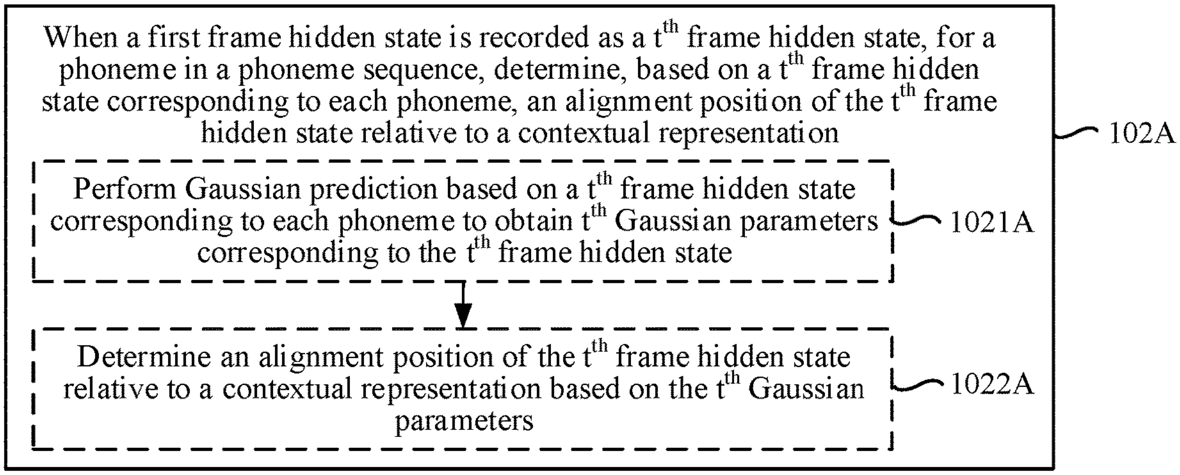

Referring to FIG. 5, which is a schematic flowchart of an AI-based audio signal generation method according to an embodiment of the present disclosure, step 102A in FIG. 4 can be implemented as step 1021A and step 1022A in FIG. 5. Step 1021A. Gaussian prediction is performed on a $t^{th}$ frame hidden state corresponding to each phoneme to obtain $t^{th}$ Gaussian parameters corresponding to the $t^{th}$ frame hidden state. Step 1022A. Determine, based on the $t^{th}$ Gaussian parameters, an alignment position of the $t^{th}$ frame hidden state relative to the contextual representation.

Following the above example, the Gaussian attention mechanism includes a fully connected layer, performs Gaussian prediction on a $t^{th}$ frame hidden state corresponding to each phoneme through the fully connected layer to obtain $t^{th}$ Gaussian parameters corresponding to the $t^{th}$ frame hidden state, and determines, based on the $t^{th}$ Gaussian parameters, an alignment position of the $t^{th}$ frame hidden state relative to the contextual representation. A monotonic, normalized, stable, and high-performance Gaussian attention mechanism performs stop prediction to ensure the progress of decoding, and whether decoding stops is determined directly based on an alignment position, which solves the problem of early stop and improves the naturalness and stability of speech synthesis.

For example, Gaussian function-based prediction is performed on a $t^{th}$ frame hidden state corresponding to each phoneme to obtain a $t^{th}$ Gaussian variance and a $t^{th}$ Gaussian mean variation corresponding to the $t^{th}$ frame hidden state; $(t-1)^{th}$ Gaussian parameters corresponding to a $(t-1)^{th}$ frame hidden state are determined; a $(t-1)^{th}$ Gaussian mean included in the $(t-1)^{th}$ Gaussian parameters and the $t^{th}$ Gaussian mean variation are added together to obtain a $t^{th}$ Gaussian mean corresponding to the $t^{th}$ frame hidden state; a set of the $t^{th}$ Gaussian variance and the $t^{th}$ Gaussian mean is taken as $t^{th}$ Gaussian parameters corresponding to the $t^{th}$ frame hidden state; and the $t^{th}$ Gaussian mean is taken as an alignment position of the $t^{th}$ frame hidden state relative to the contextual representation. Therefore, an alignment position is accurately determined based on a Gaussian mean determined by the Gaussian attention mechanism, and whether decoding stops is determined directly based on the alignment position, which solves the problem of early stop and improves the stability and the integrity of speech synthesis.

In some embodiments, whether the alignment position corresponds to the end position in the contextual representation is determined as follows: a content text length of the contextual representation of the phoneme sequence is determined; it is determined that the alignment position corresponds to the end position in the contextual representation when the $t^{th}$ Gaussian mean is greater than the content text length; and it is determined that the alignment position corresponds to a non-end position in the contextual representation when the $t^{th}$ Gaussian mean is less than or equal to the content text length. Therefore, whether decoding stops can be quickly and accurately determined by simply comparing the Gaussian mean with the content text length, which improves the speed and the accuracy of speech synthesis.

Figure 8:
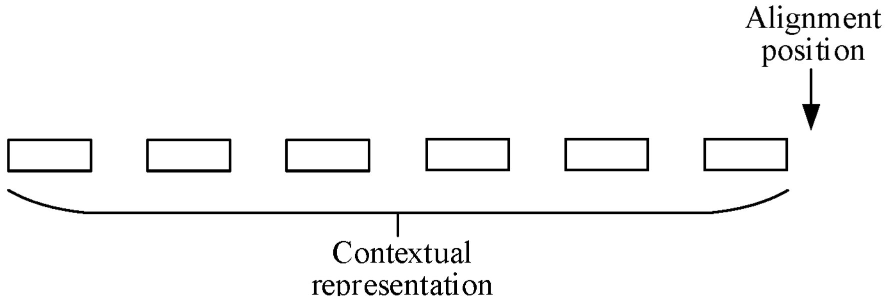
FIG. 8 is a schematic diagram illustrating an alignment position corresponds to the end position in a contextual representation according to an embodiment of the present disclosure.

As shown in FIG. 8, for example, the content text length of the contextual representation is 6, the alignment position corresponds to the end position in the contextual representation when the $t^{th}$ Gaussian mean is greater than the content text length, that is, the alignment position refers to the end position in the contextual representation.

Figure 9:
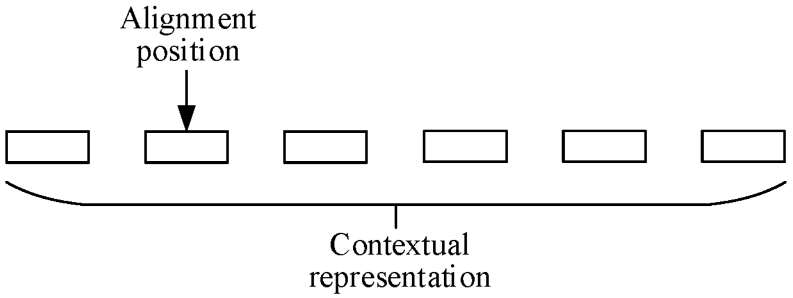
FIG. 9 is a schematic diagram illustrating an alignment position corresponds to a non-end position in a contextual representation according to an embodiment of the present disclosure.

As shown in FIG. 9, for example, the content text length of the contextual representation is 6, the alignment position corresponds to a non-end position in the contextual representation when the $t^{th}$ Gaussian mean is less than or equal to the content text length, that is, the alignment position refers to a position containing content in the contextual representation. For example, the alignment position refers to a position of the second content in the contextual representation.

In some embodiments, the operation of decoding the contextual representation and the $t^{th}$ frame hidden state to obtain a $(t+1)^{th}$ frame hidden state includes the operation of: determining an attention weight corresponding to the $t^{th}$ frame hidden state; weighting, based on the attention weight, the contextual representation to obtain a contextual vector corresponding to the contextual representation; and performing state prediction on the contextual vector and the $t^{th}$ frame hidden state to obtain a $(t+1)^{th}$ frame hidden state.

For example, the alignment position corresponds to a non-end position in the contextual representation, which indicates that decoding needs to be performed, the Gaussian attention mechanism determines an attention weight corresponding to the $t^{th}$ frame hidden state, weights the contextual representation based on the attention weight to obtain a contextual vector corresponding to the contextual representation, and transmits the contextual vector to the autoregressive decoder, and the autoregressive decoder performs state prediction on the contextual vector and the tt frame hidden state to obtain a $(t+1)^{th}$ frame hidden state so as to realize the autoregression of the hidden state. As a result, the hidden states have contextual correlation. A hidden state of each frame can be accurately determined based on the contextual correlation, and whether decoding needs to continue can be accurately determined based on whether an accurate hidden state represents a non-end position, which improves the accuracy and the integrity of audio signal synthesis.

In some embodiments, the operation of determining an attention weight corresponding to the $t^{th}$ frame hidden state includes the operation of: determining $t^{th}$ Gaussian parameters corresponding to the $t^{th}$ frame hidden state, the $t^{th}$ Gaussian parameters including a $t^{th}$ Gaussian variance and a $t^{th}$ Gaussian mean; and performing, based on the $t^{th}$ Gaussian variance and the $t^{th}$ Gaussian mean, Gaussian processing on the contextual representation to obtain an attention weight corresponding to the $t^{th}$ frame hidden state. The Gaussian attention mechanism determines an attention weight corresponding to a hidden state based on a Gaussian variance and a Gaussian mean, and accurately allocates importance of each hidden state to accurately represent the next hidden state, which improves the accuracy of speech synthesis and audio signal generation.

For example, a formula for calculating an attention weight is $$\alpha_{t,j} = \exp\left(-\frac{(j-\mu_t)^2}{2\sigma_t^2}\right),$$

where, $\alpha_{t,j}$ represents an attention weight of a $j^{th}$ element in a phoneme sequence inputted into the content encoder during a $t^{th}$ iterative calculation (a $t^{th}$ frame hidden state), $\mu_t$ represents a mean of a Gaussian function during the $t^{th}$ calculation, and $\sigma_t^2$ represents a variance of the Gaussian function during the $t^{th}$ calculation. The embodiments of the present disclosure are not limited to $$\alpha_{t,j} = \exp\left(-\frac{(j-\mu_t)^2}{2\sigma_t^2}\right),$$

and other variant weight calculation formulas are also applicable to the embodiments of the present disclosure.

Step 104. Synthesize the first frame hidden state and the second frame hidden state to obtain an audio signal corresponding to the text.

For example, the first frame hidden state represents a hidden state of the first frame, the second frame hidden state represents a hidden state of the second frame, and the first frame and the second frame are any two adjacent frames in frequency spectrum data corresponding to each phoneme. Hidden states of T frames are concatenated to obtain a hidden state corresponding to a text when an alignment position corresponds to the end position in a contextual representation, the hidden state corresponding to the text is smoothed to obtain frequency spectrum data corresponding to the text, Fourier transform is performed on the frequency spectrum data corresponding to the text to obtain a digital audio signal corresponding to the text. Whether decoding stops is determined based on an alignment position, which solves the problem of early stop of decoding and improves the stability and the integrity of speech synthesis.

It should be noted that, when digital voice needs to be outputted, a digital audio signal needs to be converted into an analog audio signal by DAC, and voice is outputted through the analog audio signal.

In some embodiments, a neural network model needs to be trained to implement the audio signal generation method, and the audio signal generation method is implemented by invoking the neural network model. A method for training the neural network model includes: an initialized neural network model encodes a phoneme sequence sample corresponding to a text sample to obtain a contextual representation of the phoneme sequence sample; a predicted alignment position of a third frame hidden state relative to the contextual representation is determined based on the third frame hidden state corresponding to each phoneme in the phoneme sequence sample; the contextual representation and the third frame hidden state are decoded to obtain a fourth frame hidden state when the predicted alignment position corresponds to a non-end position in the contextual representation; frequency spectrum post-processing is performed on the third frame hidden state and the fourth frame hidden state to obtain predicted frequency spectrum data corresponding to the text sample; a loss function for the neural network model is constructed based on the predicted frequency spectrum data corresponding to the text sample and frequency spectrum data annotations corresponding to the text sample; and parameters of the neural network model are updated, and parameters of the neural network model that are updated during the convergence of the loss function are taken as parameters of the neural network model after training. The third frame hidden state represents a hidden state of the third frame, the fourth frame hidden state represents a hidden state of the fourth frame, and the third frame and the fourth frame are any two adjacent frames in frequency spectrum data corresponding to each phoneme in the phoneme sequence sample.

For example, after a value of the loss function for the neural network model is determined based on the predicted frequency spectrum data corresponding to the text sample and the frequency spectrum data annotations corresponding to the text sample, whether the value of the loss function for the neural network model excesses a preset threshold, an error signal of the neural network model is determined based on the loss function for the neural network model when the value of the loss function for the neural network model excesses the preset threshold, error information is reversely broadcast in the neural network model, and model parameters of each layer are updated during broadcast.

The back-propagation is described herein. Training sample data is inputted into an input layer of a neural network model, passes through a hidden layer, and finally, and reaches an output layer, and a result is outputted, which is a forward propagation process of the neural network model. Because there is an error between an output result of the neural network model and an actual result, an error between the output result and an actual value is calculated, and the error is back-propagated from the output layer to the hidden layer until it is propagated to the input layer. In the back-propagation process, the value of the model parameter is adjusted according to the error. The foregoing process is continuously iterated until convergence is achieved.

In some embodiments, before the parameters of the neural network model are updated, a parameter matrix is constructed based on the parameters of the neural network model; block division is performed on the parameter matrix to obtain multiple matrix blocks included in the parameter matrix; a mean of parameters in each matrix block is determined at the timing of structure sparsity; and the matrix blocks are sorted in ascending order based on the mean of the parameters in each matrix block, the first multiple matrix blocks in an ascending sort result are reset to obtain a reset parameter matrix. The reset parameter matrix is used for updating the parameters of the neural network model.

Figure 10:
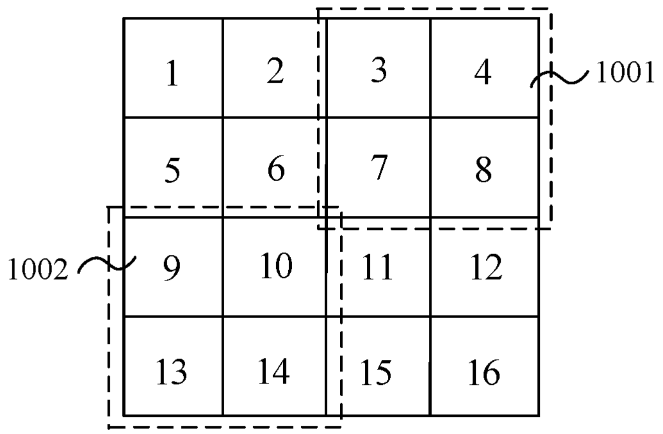
FIG. 10 is a schematic diagram of a parameter matrix according to an embodiment of the present disclosure.

As shown in FIG. 10, in order to increase the speed of audio synthesis, during training of the neural network model, the parameters of the neural network model are subjected to block training. First, a parameter matrix is constructed based on all parameters of the neural network model, then, block division is performed on the parameter matrix to obtain a matrix block 1, a matrix block 2, . . . , and a matrix block 16, a mean of parameters in each matrix block is determined when preset training number or preset training time is satisfied, the matrix blocks are sorted in ascending order based on the mean of the parameters in each matrix block, and parameters in the first multiple matrix blocks in an ascending sort result are reset to 0. For example, parameters in the first 8 matrix blocks need to be reset to 0, and the matrix block 3, the matrix block 4, the matrix block 7, the matrix block 8, the matrix block 9, the matrix block 10, the matrix block 13, and the matrix block 14 are the first 8 matrix blocks in the ascending sort result. Parameters in a dashed box 1001 (including the matrix block 3, the matrix block 4, the matrix block 7, and the matrix block 8) and a dashed box 1002 (including the matrix block 9, the matrix block 10, the matrix block 13, and the matrix block 14) are reset to 0, and a reset parameter matrix is obtained. In that way, multiply operations of the parameter matrix can be accelerated to increase the training speed and improve the efficiency of audio signal generation.

In some embodiments, before a loss function for the neural network model is constructed, a content text length of the contextual representation of the phoneme sequence sample is determined; a position loss function for the neural network model is constructed based on a predicted alignment position and the content text length when the predicted alignment position corresponds to the end position in a contextual representation; a frequency spectrum loss function for the neural network model is constructed based on predicted frequency spectrum data corresponding to the text sample and frequency spectrum data annotations corresponding to the text sample; and weighted summation is performed on the frequency spectrum loss function and the position loss function to obtain a loss function for the neural network model.

For example, in order to solve the problems of early stop of decoding, word missing, and repeated reading, a position loss function for the neural network model is constructed, so that the trained neural network model can learn the ability to accurately predict an alignment position. As a result, the stability of speech synthesis is improved, and the accuracy of audio signal generation is improved.

An exemplary application of the embodiments of the present disclosure in an actual speech synthesis application scenario will be described below.

The embodiments of the present disclosure are applicable to various speech synthesis application scenarios (e.g., smart devices with the speech synthesis function, such as an intelligent speaker, a speaker with a screen, a smart watch, a smartphone, a mart home, a smart map, and smart car, and applications with the speech synthesis function such as online education, an intelligent robot, AI customer services, and a speech synthesis cloud service). For example, for a vehicle application, it is inconvenient for a user to acquire information from a text when driving, but the user can acquire information from a speech to avoid missing important information. The vehicle client needs to convert a text into a speech after receiving the text and play the speech for the user, so that the user can listen to the speech corresponding to the text timely.

The AI-based audio synthesis method according to the embodiments of the present disclosure will be described below by taking speech synthesis as an example.

The embodiments of the present disclosure use single Gaussian attention mechanism, which is a monotonic, normalized, stable, and high-performance attention mechanism, to solve the instability of the attention mechanism in the related technology, remove the Stop Token mechanism, use Attentive Stop Loss (used for determining a value of stop during autoregressive decoding, for example, it is set that the probability exceeds a threshold by 0.5) to ensure a result, and directly determine stop of decoding based on an alignment position, which solves the problem of early stop and improves the naturalness and stability of speech synthesis. In the other hand, the embodiments of the present disclosure perform block sparsity on an autoregressive decoder by the pruning technique, which further increases the speed of training and synthesis. A synthetic real-time rate of 35× can be achieved on a single-core central processing unit (CPU), so that TTS can be deployed on edge devices.

The embodiments of the present disclosure are applicable to all products with the speech synthesis function, which include, but are not limited to, smart devices such as an intelligent speaker, a speaker with a screen, a smart watch, a smartphone, a smart home, a smart car, and a vehicle terminal, an intelligent robot, AI customer services, and a TTS cloud service. In usage scenarios, the stability of synthesis can be improved and the speed of synthesis can be increased by the algorithms according to the embodiments of the present disclosure.

Figure 11:
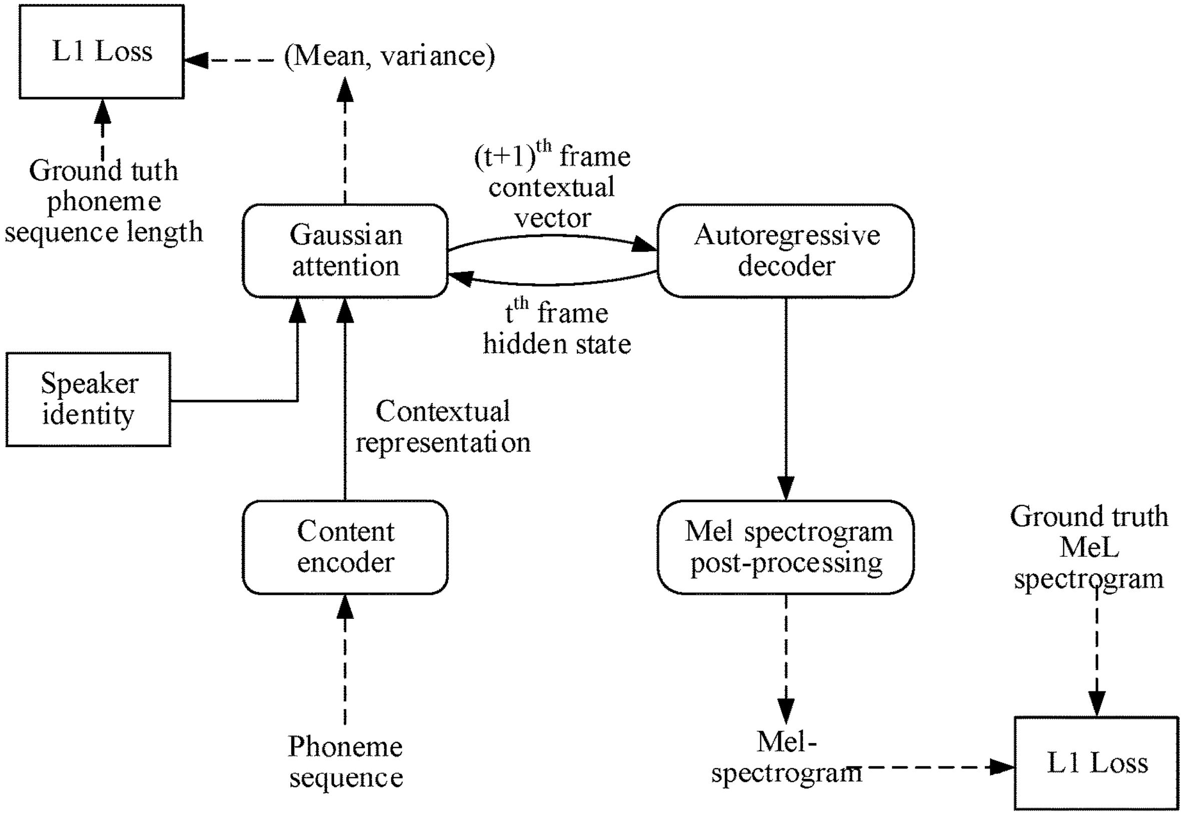
FIG. 11 is a schematic flowchart of a method for training an end-to-end speech synthesis acoustic model according to an embodiment of the present disclosure.

As shown in FIG. 11, an end-to-end speech synthesis acoustic model (implemented as, for example, a neural network model) according to the embodiments of the present disclosure includes a content encoder, a Gaussian attention mechanism, an autoregressive decoder, and a frequency spectrum post-processing network. The modules of the end-to-end speech synthesis acoustic model will be specifically described below. For example, the model can be used in a ground truth autoregressive training stage.

1) The content encoder is configured to convert an inputted phoneme sequence into a vector sequence (contextual representation) for representing the contextual content of a text, and is composed of models with contextual correlation, and the representation outputted by the content encoder have the ability to model the context. A linguistic feature represents the content of a text for which audio needs to be synthesized, which includes basic units of the text, i.e., characters or phonemes. During synthesis of a Chinese speech, a text is composed of initials, finals, and silent syllables, and the finals are tonal. For example, a tonal phoneme sequence of a text of "speech synthesis" is "v3 in1 h e2 ch eng2".

2) The Gaussian attention mechanism is configured to generate corresponding content contextual information (contextual vector) with reference to a current state of the decoder, so that the autoregressive decoder can better predict the next frame of frequency spectrum based on the content contextual information. Speech synthesis is the task of building a monotonic mapping from a text sequence to frequency spectrum sequence. Therefore, during generation of each frame of Mel spectrogram, only a small part of the phoneme content needs to be focused, and this part of the phoneme content is generated by the attention mechanism. A speaker identity, as a unique identifier of a speaker, is represented by a set of vectors.

3) The autoregressive decoder is configured to generate a current frame of frequency spectrum based on the current content contextual information generated by the Gaussian attention mechanism and the previous frame of predicted frequency spectrum. The generation of a current frame depends on the outputted previous frame, so the decoder is referred to as an autoregressive decoder. Replacement of the autoregressive decoder with a parallel fully connected form can further increase the speed of training.

4) Mel spectrogram post-processing network is configured to smooth a frequency spectrum predicted by the autoregressive decoder to obtain a frequency spectrum with higher quality.

Figure 12:
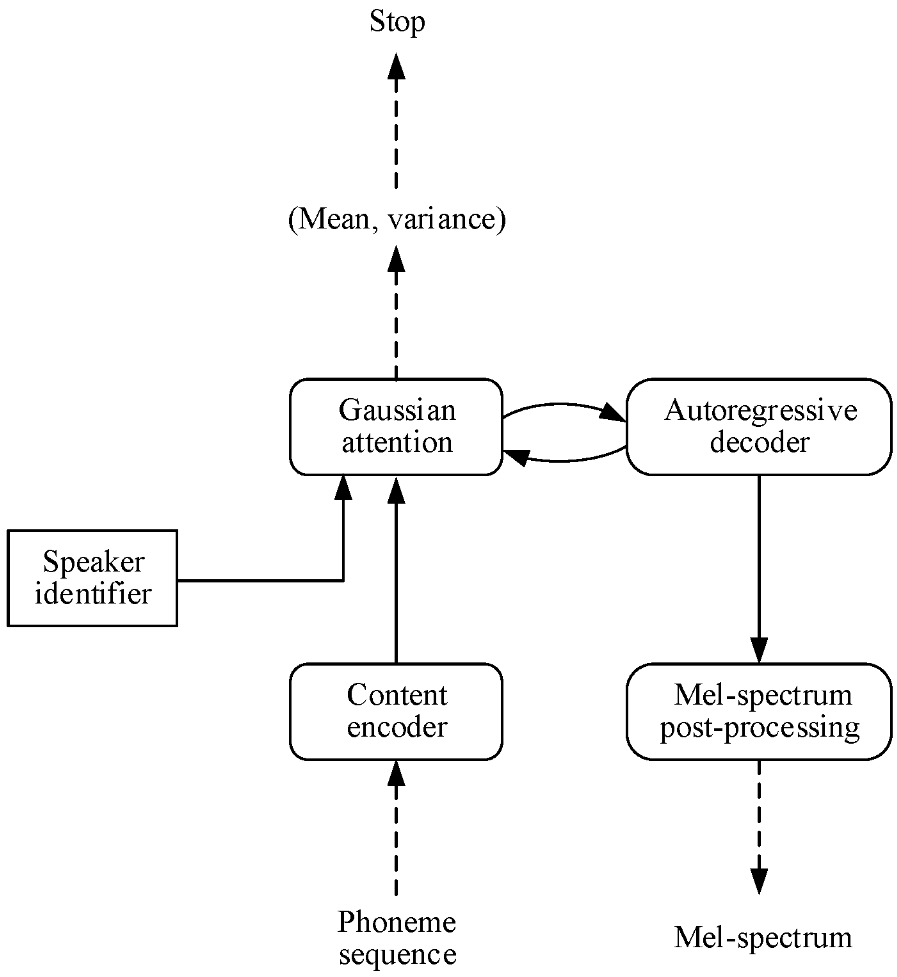
FIG. 12 is a schematic flowchart of reasoning with the end-to-end speech synthesis acoustic model according to an embodiment of the present disclosure.

Optimization of the stability and the speed of speech synthesis according to the embodiments of the present disclosure will be specifically described below with reference to FIG. 11 and FIG. 12.

A) As shown in FIG. 11, the embodiments of the present disclosure adopt a single Gaussian attention mechanism, which is a monotonic, normalized, stable, and high-performance attention mechanism. The single Gaussian attention mechanism calculates an attention weight by formula (1) and formula (2):

$$\alpha_{i,j} = \exp\left(-\frac{(j-\mu_i)^2}{2\sigma_i^2}\right) \quad (1)$$

$$\mu_i = \mu_{i-1} + \Delta_i \quad (2)$$

where, $\alpha_{i,j}$ represents an attention weight of a $j^{th}$ element in a phoneme sequence inputted into the content encoder during a $i^{th}$ iterative calculation, exp represents an exponential function, $\mu_i$ represents a mean of a Gaussian function during the $i^{th}$ calculation, $\sigma_i^2$ represents a variance of the Gaussian function during the $i^{th}$ calculation, and $\Delta_i$ represents a predicted mean variation during the $i^{th}$ iterative calculation. The mean variation and the variance are obtained based on a hidden state of the autoregressive decoder through by a fully connected network.

A Gaussian mean variation and a Gaussian variance at the current moment are predicted during each iteration, the cumulative sum of the mean variation represents a position of an attention window at the current moment, i.e., a position of an inputted linguistic feature aligned with the attention window, and the variance represents the width of the attention window. A phoneme sequence is taken as an input of the content encoder, a contextual vector required by the autoregressive decoder is obtained by the Gaussian attention mechanism, the autoregressive decoder generates a Mel spectrogram in an autoregressive manner, and a stop token for the autoregressive decoding is determined by whether a mean of a Gaussian attention distribution reaches the end of the phoneme sequence. The embodiments of the present disclosure ensure the monotonicity of alignment by ensuring that a mean variation is nonnegative. Furthermore, the Gaussian function is normalized, so that the stability of the attention mechanism is ensured.

A contextual vector required by the autoregressive decoder at each moment is obtained by adding a weight generated by the Gaussian attention mechanism and an output of the content encoder together, a size distribution of the weight is determined by a mean of the Gaussian attention, and the speech synthesis task is a strict and monotonic task, that is, an outputted Mel spectrogram is monotonically generated from left to right according to an inputted text. Therefore, it is determined that the Mel spectrogram generation is close to the end when a mean of the Gaussian attention is located at the end of an inputted phoneme sequence. The width of the attention window represents a range of the content outputted by the content encoder that is required for each decoding, and the width is affected by a language structure. For example, for silence prediction of pauses, the width is relatively small; for words or phrases, the width is relatively large, this is because the pronunciation of a word in words or a phrase is affected by words before and after it.

B) The embodiments of the present disclosure remove the separated Stop Token architecture, use Gaussian attention to directly determine stop of encoding based on an alignment position, and use Attentive Stop Loss to ensure an alignment result, which solves the problem of early stop of decoding of complex or long sentences. It is assumed that a mean at the last moment of training needs to be iterated to the next position in the inputted text length, and L1 Loss (i.e. $L_{stop}$) between the mean of the Gaussian distribution and the inputted text sequence length is constructed based on this assumption, which is shown as formula (3). As shown in FIG. 12, during reasoning, a solution according to the embodiments of the present disclosure determines whether to stop according to whether a mean of the Gaussian attention at the current moment is greater than the inputted context length plus 1.

$$L_{stop} = |\mu_I - J - 1| \quad (3)$$

where, $\mu_I$ is the total number of iterations, and J is the length of a phoneme sequence.

When the Stop Token architecture is adopted, because the Stop Token does not take into account the integrity of phonemes, the early stop of decoding may occur. A significant problem brought by the Stop Token architecture is that the first and last silences and intermediate pauses of recorded audio need to be of similar lengths, so that the Stop Token architecture can realize accurate prediction. Once a recorder pauses for a relatively long time, the trained Stop Token prediction is incorrect. Therefore, the Stop Token architecture has high requirements for the quality of data, which brings relatively high audit costs. The attention stop loss according to the embodiments of the present disclosure has low requirements for the quality of data, which reduces costs.

C) The embodiments of the present disclosure perform block sparsity on the autoregressive decoder to increase the calculation speed of the autoregressive decoder. For example, a sparsity solution adopted in the present disclosure is that: from the 1000th training, structure sparsity is performed every 400 trainings until 50% sparsity is realized at the 120000th training. L1 Loss between a Mel spectrogram predicted by the model and a ground truth Mel spectrogram is taken a target to be optimized, and parameters of the whole model are optimized by a stochastic gradient descent algorithm. The embodiments of the present disclosure divide a weight matrix into multiple blocks (matrix blocks), sort the blocks from smallest to largest according to a mean of model parameters in each block, and reset parameters in the first 50% (set as needed) of the blocks to 0 to accelerate decoding.

When a matrix is block-sparse, that is, the matrix is divided into N blocks, and elements in some blocks are 0, a multiply operation of the matrix can be accelerated. Elements in some blocks are set to 0 during training. This is determined by the magnitude of the elements, that is, elements in a block are approximately 0 when the average magnitude of the elements in the block is small or close to 0 (that is, less than a certain threshold), which achieves the purpose of sparsity. In practice, elements in multiple blocks of a matrix can be sorted according to a mean, and sparsity is performed on the first 50% of the blocks with smaller average magnitudes, that is, the elements are uniformly set to zero.

In practice, first a text is converted into a phoneme sequence, the context encoder encodes the phoneme sequence to obtain a vector sequence (i.e. a contextual representation) representing the contextual content of the text. During prediction of a Mel spectrogram, first an all-zero vector is input into the autoregressive decoder as the initial contextual vector, a hidden state outputted by the autoregressive decoder each time is used as an input of the Gaussian attention mechanism, a weight for an output of the content encoder at each moment can be calculated, and a contextual vector required by the autoregressive decoder at each moment can be calculated based on the weight and the abstract representation of the content encoder. Autoregressive decoding performed in this way stops when a mean of the Gaussian attention is located at the end of the abstract representation (phoneme sequence) of the content encoder. Mel-spectra (hidden states) predicted by the autoregressive decoder are concatenated together, and a combined Mel spectrogram is transmitted to a Mel spectrogram post-processing network. As a result, the Mel spectrogram is smoother, and the generation of the Mel spectrogram depends not only on past information, but also on further information. After a final Mel spectrogram is obtained, a final audio waveform is obtained by signal processing or a neural network synthesizer to realize speech synthesis.

Based on the above, the embodiments of the present disclosure have the following beneficial effects. 1) By the combination of the monotonic and stable Gaussian attention mechanism and Attentive Stop Loss, the stability of speech synthesis is effectively improved, and unbearable phenomena such as repeated reading and word missing are avoided. 2) Block sparsity is performed on the autoregressive decoder, so that the synthesis speed of the acoustic model is increased to a large extent, and the requirements for hardware devices are reduced.

The embodiments of the present disclosure provide a more robust attention mechanism acoustic model (implemented as, for example, a neural network model), which has the advantages of high speed and high stability. The acoustic model is applicable to embedded devices such as a smart home and a smart car. Due to the low computing power of these embedded devices, it is easier to realize end-to-end speech synthesis on the devices. Due to high robustness, the solution is applicable to scenarios of personalized voice customization with low data quality in non-studio scenarios, such as user voice customization for mobile phone maps, and large-scale online teacher voice cloning in online education. Because recording users in these scenarios are not professional voice actors, there may be long pauses in a recording. For this type of data, the embodiments of the present disclosure can effectively ensure the stability of the acoustic model.

The AI-based audio signal generation method according to the embodiments of the present disclosure has been described with reference to the exemplary application and implementation of the server according to the embodiments of the present disclosure. The embodiments of the present disclosure also provide an audio signal generation apparatus. In practice, functional modules in the audio signal generation apparatus may be implemented as a combination of hardware resources of an electronic device (e.g. a terminal device, a server or a server cluster), such as a computing resource (e.g. a processor), a communication resource (configured to support implementation of various communication modes such as optical cable communication and cellular communication), and a memory. FIG. 2 shows an audio signal generation apparatus 555 stored in a memory 550, which may be software in the form of programs or plug-in, such as a software module designed by using programming languages such as C/C++ and Java, application software or a dedicated software module in a large software system designed by using programming languages such as C/C++ and Java, an API, a plug-in, and a cloud service. The description will be made by taking various implementation modes as examples.

Embodiment 1 a Case where the Audio Signal Generation Apparatus is a Mobile Terminal Application Program or Module The audio signal generation apparatus 555 according to the embodiments of the present disclosure can be provided as a soft module designed by using programming languages such as C/C++ and Java, which is embedded into various Android or iOS system-based mobile terminal applications (stored as executable instructions in a storage medium in a mobile terminal and executed by a processor in the mobile terminal). The mobile terminal uses its own computing resources to complete related information recommendation tasks, and transmits regularly or irregularly processing results to a remote server through various network communication modes or stores the processing results locally.

Embodiment 2 a Case where the Audio Signal Generation Apparatus is a Server Application Program or Platform The audio signal generation apparatus 555 according to the embodiments of the present disclosure can be proved as application software or a dedicated software module in a large software system designed by using programming languages such as C/C++ and Java, which runs in a server (stored as executable instructions in a storage medium in the server and executed by a processor in the server), and the server uses its own computing resources to complete related audio signal generation tasks.

The embodiments of the present disclosure can also be provided as an audio signal generation platform for individuals, groups or companies that is formed by a distributed parallel computing platform composed of multiple servers carrying customized and easy-to-interact Web interfaces or other user interfaces (UIs).

Embodiment 3 a Case where the Audio Signal Generation Apparatus is a Server API or Plug-In The audio signal generation apparatus 555 according to the embodiments of the present disclosure can be provided as an API or a plug-in in a server that, when invoked by users, implements the AI-based audio signal generation method according to the embodiments of the present disclosure, and the API or plug-in are embedded into various application programs.

Embodiment 4 a Case where the Audio Signal Generation Apparatus is a Mobile Device Client API or Plug-In The audio signal generation apparatus 555 according to the embodiments of the present disclosure can be provided as an API or a plug-in in a mobile device that, when invoked by users, implements the AI-based audio signal generation method according to the embodiments of the present disclosure.

Embodiment 5 a Case that the Audio Signal Generation Apparatus is a Cloud Open Service The audio signal generation apparatus 555 according to the embodiments of the present disclosure can be provided as an information recommendation cloud service open to users, from which individuals, groups or companies can acquire audio.

The audio signal generation apparatus 555 includes a series of modules, which include an encoding module 5551, an attention module 5552, a decoding module 5553, a synthesis module 5554, and a training module 5555. How the modules in the audio signal generation apparatus 555 according to the embodiments of the present disclosure cooperate to implement the audio signal generation solution will be described below.

The encoding module 5551 is configured to convert a text into a phoneme sequence corresponding to the text; and encode the phoneme sequence to obtain a contextual representation of the phoneme sequence; the attention module 5552 is configured to determine, based on a first frame hidden state corresponding to each phoneme in the phoneme sequence, an alignment position of the first frame hidden state relative to the contextual representation; the decoding module 5553 is configured to decode the contextual representation and the first frame hidden state to obtain a second frame hidden state when the alignment position corresponds to a non-end position in the contextual representation; and the synthesis module 5554 is configured to synthesize the first frame hidden state and the second frame hidden state to obtain an audio signal corresponding to the text.

In some embodiments, the first frame hidden state represents a hidden state of the first frame, the second frame hidden state represents a hidden state of the second frame, and the first frame and the second frame are any two adjacent frames in frequency spectrum data corresponding to each phoneme. When the first frame hidden state is recorded as a $t^{th}$ frame hidden state, the attention module 5552 is further configured to, for each phoneme in the phoneme sequence, determine an alignment position of the $t^{th}$ frame hidden state relative to the contextual representation based on the $t^{th}$ frame hidden state corresponding to each phoneme. Correspondingly, the decoding module 5553 is further configured to decode the contextual representation and the $t^{th}$ frame hidden state to obtain a $(t+1)^{th}$ frame hidden state when the alignment position of the $t^{th}$ frame hidden state relative to the contextual representation corresponds to a non-end position in the contextual representation. T is a natural number increasing from 1 and satisfies the condition of $1 \le t \le T$, T is the total number of frames corresponding to the phoneme sequence when the alignment position corresponds to the end position in the contextual representation, the total number of frames represents the number of frames of frequency spectrum data corresponding to hidden states of phonemes in the phoneme sequence, and T is a natural number greater than or equal to 1.

In some embodiments, the synthesis module 5554 is further configured to concatenate hidden states of T frames to obtain a hidden state corresponding to the text when the alignment position corresponds to the end position of the contextual representation; smooth the hidden state corresponding to the text to obtain frequency spectrum data corresponding to the text; and perform Fourier transform on the frequency spectrum data corresponding to the text to obtain an audio signal corresponding to the text.

In some embodiments, the attention module 5552 is further configured to perform Gaussian prediction on the $t^{th}$ frame hidden state corresponding to each phoneme to obtain $t^{th}$ Gaussian parameters corresponding to the $t^{th}$ frame hidden state; and determine, based on the $t^{th}$ Gaussian parameters, an alignment position of the $t^{th}$ frame hidden state relative to the contextual representation.

In some embodiments, the attention module 5552 is further configured to determine $(t-1)^{th}$ Gaussian parameters corresponding to a $(t-1)^{th}$ frame hidden state; add a $(t-1)^{th}$ Gaussian mean included in the $(t-1)^{th}$ Gaussian parameters and a $t^{th}$ Gaussian mean variation together to obtain a $t^{th}$ Gaussian mean corresponding to the $t^{th}$ frame hidden state; and take a set of the $t^{th}$ Gaussian variance and the $t^{th}$ Gaussian mean as $t^{th}$ Gaussian parameters corresponding to the $t^{th}$ frame hidden state; and take the $t^{th}$ Gaussian mean as the alignment position of the $t^{th}$ frame hidden state relative to the contextual representation.

In some embodiments, the attention module 5552 is further configured to determine a content text length of the contextual representation of the phoneme sequence; determine that the alignment position corresponds to the end position in the contextual representation when the $t^{th}$ Gaussian mean is greater than the content text length; and determine that the alignment position corresponds to a non-end position in the contextual representation when the $t^{th}$ Gaussian mean is less than or equal to the content text length.

In some embodiments, the decoding module 5553 is further configured to determine an attention weight corresponding to the $t^{th}$ frame hidden state; weight, based on the attention weight, the contextual representation to obtain a contextual vector corresponding to the contextual representation; and perform state prediction on the contextual vector and the $t^{th}$ frame hidden state to obtain a $(t+1)^{th}$ frame hidden state.

In some embodiments, the attention module 5552 is further configured to determine $t^{th}$ Gaussian parameters corresponding to the $t^{th}$ frame hidden state, the $t^{th}$ Gaussian parameters including a $t^{th}$ Gaussian variance and a $t^{th}$ Gaussian mean; and perform, based on the $t^{th}$ Gaussian variance and the $t^{th}$ Gaussian mean, Gaussian processing on the contextual representation to obtain an attention weight corresponding to the $t^{th}$ frame hidden state.

In some embodiments, the audio signal generation method is implemented by invoking a neural network model. The audio signal generation apparatus 555 further includes a training module 5555, configured to encode a phoneme sequence sample corresponding to a text sample through the initialized neural network model to obtain a contextual representation of the phoneme sequence sample; determine, based on a third frame hidden state corresponding to each phoneme in the phoneme sequence sample, a predicted alignment position of the third frame hidden state relative to the contextual representation; decode the contextual representation and the third frame hidden state to obtain a fourth frame hidden state when the predicted alignment position corresponds to a non-end position in the contextual representation; perform frequency spectrum post-processing on the third frame hidden state and the fourth frame hidden state to obtain predicted frequency spectrum data corresponding to the text sample; constructing, based on the predicted frequency spectrum data corresponding to the text sample and frequency spectrum data annotations corresponding to the text sample, a loss function for the neural network model; and updating parameters of the neural network model, and taking parameters of the neural network model that are updated during convergence of the loss function as parameters of the neural network model after training; The third frame hidden state represents a hidden state of the third frame, the fourth frame hidden state represents a hidden state of the fourth frame, and the third frame and the fourth frame are any two adjacent frames in frequency spectrum data corresponding to each phoneme in the phoneme sequence sample.

In some embodiments, the training module 5555 is further configured to construct a parameter matrix based on parameters of the neural network model; perform block division on the parameter matrix to obtain multiple matrix blocks included in the parameter matrix; determine a mean of parameters in each matrix block at the timing of structure sparsity; and sorting, based on the mean of the parameters in each matrix block, the matrix blocks in ascending order, and resetting parameters in the first multiple matrix blocks in an ascending sort result to obtain a reset parameter matrix; the reset parameter matrix is used for updating the parameters of the neural network model.

In some embodiments, the training module 5555 is further configured to acquire a content text length of the contextual representation of the phoneme sequence sample; constructing, based on the predicted alignment position and the content text length, a position loss function for the neural network model when the predicted alignment position corresponds to the end position in the contextual representation; constructing, based on the predicted frequency spectrum data corresponding to the text sample and frequency spectrum data annotations corresponding to the text sample, a frequency spectrum loss function for the neural network model; and perform weighted summation on the frequency spectrum loss function and the position loss function to obtain a loss function for the neural network model.

In some embodiments, the encoding module 5551 is further configured to perform forward encoding on the phoneme sequence to obtain a forward hidden vector of the phoneme sequence; perform backward encoding on the phoneme sequence to obtain a backward hidden vector of the phoneme sequence; and fuse the forward hidden vector and the backward hidden vector to obtain a contextual representation of the phoneme sequence.

In some embodiments, the encoding module 5551 is further configured to encode all phonemes in the phoneme sequence in sequence in a first direction through an encoder to obtain hidden vectors of all phonemes in the first direction; encode all phonemes in sequence in a second direction through the encoder to obtain hidden vectors of all phonemes in the second direction; and concatenate the forward hidden vector and the backward hidden vector to obtain a contextual representation of the phoneme sequence. The second direction is opposite to the first direction.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

According to an aspect of the embodiments of the present disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the AI-based audio signal generation method for acquiring a position in a virtual scene in the embodiment of the present disclosure.

An embodiment of the present disclosure further provides a computer-readable storage medium storing executable instructions, the executable instructions, when executed by a processor, causing the processor to perform the AI-based audio signal generation method, for example, the AI-based audio signal generation method as shown in FIGS. 3-5, provided by the embodiments of the present disclosure.

In some embodiments, the computer-readable storage medium may be a memory such as an FRAM, a ROM, a PROM, an EPROM, an EEPROM, a flash memory, a magnetic surface memory, an optical disk, or a CD-ROM; or may be any device including one of or any combination of the foregoing memories.

In some embodiments, the executable instructions can be written in a form of a program, software, a software module, a script, or code and according to a programming language (comprising a compiler or interpreter language or a declarative or procedural language) in any form, and may be deployed in any form, comprising an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

The foregoing descriptions are merely embodiments of the present disclosure and are not intended to limit the protection scope of the present disclosure. Any modification, equivalent replacement, or improvement made without departing from the spirit and range of the present disclosure shall fall within the protection scope of the present disclosure.

What is claimed is:

1. An artificial intelligence (AI)-based audio signal generation method, implemented by an electronic device, the method comprising:

converting a text into a corresponding phoneme sequence;

encoding the phoneme sequence to obtain a contextual representation of the phoneme sequence;

determining, based on a first frame hidden state corresponding to a phoneme in the phoneme sequence, an alignment position of the first frame hidden state relative to the contextual representation;

decoding the contextual representation and the first frame hidden state to obtain a second frame hidden state when the alignment position corresponds to a non-end position in the contextual representation; and synthesizing the first frame hidden state and the second frame hidden state to obtain an audio signal corresponding to the text, wherein the determining, based on the first frame hidden state corresponding to the phoneme, the alignment position of the first frame hidden state relative to the contextual representation comprises: performing Gaussian prediction on the first frame hidden state corresponding to the phoneme to obtain first Gaussian parameters corresponding to the first frame hidden state; and determining, based on the first Gaussian parameters, whether the alignment position of the first frame hidden state relative to the contextual representation corresponds to a non-end position or an end position in the contextual representation, the first Gaussian parameters comprising a first Gaussian mean and a first Gaussian variance, the first Gaussian variance representing a width of an attention window, the first Gaussian variance being less when the phoneme is a silence phoneme representing a pause than when the phoneme is a non-silence phoneme.

2. The method according to claim 1, wherein the first frame hidden state represents a hidden state of the first frame, the second frame hidden state represents a hidden state of the second frame, and the first frame and the second frame are two adjacent frames in frequency spectrum data corresponding to the phoneme;

when the first frame hidden state is recorded as a $t^{th}$ frame hidden state, the determining, based on a first frame hidden state corresponding to a phoneme in the phoneme sequence, an alignment position of the first frame hidden state relative to the contextual representation comprises:

performing the following processing on the phoneme in the phoneme sequence:

determining, based on a $t^{th}$ frame hidden state corresponding to the phoneme, an alignment position of the $t^{th}$ frame hidden state relative to the contextual representation;

the decoding the contextual representation and the first frame hidden state to obtain a second frame hidden state when the alignment position corresponds to a non-end position in the contextual representation comprises:

decoding the contextual representation and the $t^{th}$ frame hidden state to obtain a $(t+1)^{th}$ frame hidden state when the alignment position of the $t^{th}$ frame hidden state relative to the contextual representation corresponds to a non-end position in the contextual representation;

t is a natural number increasing from 1 and satisfies the condition of $1 \leq t \leq T$, T is the total number of frames corresponding to the phoneme sequence when the alignment position corresponds to the end position in the contextual representation, the total number of frames represents the number of frames of frequency spectrum data corresponding to hidden states of phonemes in the phoneme sequence, and T is a natural number greater than or equal to 1.

3. The method according to claim 2, wherein the synthesizing the first frame hidden state and the second frame hidden state to obtain an audio signal corresponding to the text comprises:

concatenating hidden states of T frames to obtain a hidden state corresponding to the text when the alignment position corresponds to the end position in the contextual representation;

smoothing the hidden state corresponding to the text to obtain frequency spectrum data corresponding to the text; and performing Fourier transform on the frequency spectrum data corresponding to the text to obtain an audio signal corresponding to the text.

4. The method according to claim 2, wherein the determining, based on a $t^{th}$ frame hidden state corresponding to the phoneme, an alignment position of the $t^{th}$ frame hidden state relative to the contextual representation comprises:

performing Gaussian prediction on a $t^{th}$ hidden state corresponding to the phoneme to obtain $t^{th}$ Gaussian parameters corresponding to the $t^{th}$ frame hidden state; and determining, based on the $t^{th}$ Gaussian parameters, an alignment position of the $t^{th}$ frame hidden state relative to the contextual representation.

5. The method according to claim 4, wherein the performing Gaussian prediction on a $t^{th}$ hidden state corresponding to the phoneme to obtain $t^{th}$ Gaussian parameters corresponding to the $t^{th}$ frame hidden state comprises:

performing Gaussian function-based prediction on a $t^{th}$ frame hidden state corresponding to the phoneme to obtain a $t^{th}$ Gaussian variance and a $t^{th}$ Gaussian mean variation corresponding to the $t^{th}$ frame hidden state;

determining $(t-1)^{th}$ Gaussian parameters corresponding to a $(t-1)^{th}$ frame hidden state;

adding a $(t-1)^{th}$ Gaussian mean comprised in the $(t-1)^{th}$ Gaussian parameters and the $t^{th}$ Gaussian mean variation together to obtain a $t^{th}$ Gaussian mean corresponding to the $t^{th}$ frame hidden state; and taking a set of the $t^{th}$ Gaussian variance and the $t^{th}$ Gaussian mean as $t^{th}$ Gaussian parameters corresponding to the $t^{th}$ frame hidden state; and the determining, based on the $t^{th}$ Gaussian parameters, an alignment position of the $t^{th}$ frame hidden state relative to the contextual representation comprises:

taking the $t^{th}$ Gaussian mean as an alignment position of the $t^{th}$ frame hidden state relative to the contextual representation.

6. The method according to claim 5, wherein the method further comprises:

determining a content text length of the contextual representation of the phoneme sequence;

determining that the alignment position corresponds to the end position in the contextual representation when the $t^{th}$ Gaussian mean is greater than the content text length; and determining that the alignment position corresponds to a non-end position in the contextual representation when the $t^{th}$ Gaussian mean is less than or equal to the content text length.

7. The method according to claim 2, wherein the decoding the contextual representation and the $t^{th}$ frame hidden state to obtain a $(t+1)^{th}$ frame hidden state comprises:

determining an attention weight corresponding to the $t^{th}$ frame hidden state;

weighting, based on the attention weight, the contextual representation to obtain a contextual vector corresponding to the contextual representation; and performing state prediction on the contextual vector and the $t^{th}$ frame hidden state to obtain a $(t+1)^{th}$ frame hidden state.

8. The method according to claim 7, wherein the determining an attention weight corresponding to the $t^{th}$ frame hidden state comprises:

determining $t^{th}$ Gaussian parameters corresponding to the $t^{th}$ frame hidden state, the $t^{th}$ Gaussian parameters comprising a $t^{th}$ Gaussian variance and a $t^{th}$ Gaussian mean; and performing, based on the $t^{th}$ Gaussian variance and the $t^{th}$ Gaussian mean, Gaussian processing on the contextual representation to obtain an attention weight corresponding to the $t^{th}$ frame hidden state.

9. The method according to claim 1, wherein the audio signal generation method is implemented by invoking a neural network model; and a method for training the neural network model comprises:

encoding, by the initialized neural network model, a phoneme sequence sample corresponding to a text sample to obtain a contextual representation of the phoneme sequence sample;

determining, based on a third frame hidden state corresponding to each phoneme in the phoneme sequence sample, a predicted alignment position of the third frame hidden state relative to the contextual representation;

decoding the contextual representation and the third frame hidden state to obtain a fourth frame hidden state when the predicted alignment position corresponds to a non-end position in the contextual representation;

performing frequency spectrum post-processing on the third frame hidden state and the fourth frame hidden state to obtain predicted frequency spectrum data corresponding to the text sample;

constructing, based on the predicted frequency spectrum data corresponding to the text sample and frequency spectrum data annotations corresponding to the text sample, a loss function for the neural network model; and updating parameters of the neural network model, and taking parameters of the neural network model that are updated during convergence of the loss function as parameters of the neural network model after training;

the third frame hidden state represents a hidden state of the third frame, the fourth frame hidden state represents a hidden state of the fourth frame, and the third frame and the fourth frame are two adjacent frames in frequency spectrum data corresponding to a phoneme in the phoneme sequence sample.

10. The method according to claim 9, wherein before the updating parameters of the neural network model, the method further comprises:

constructing, based on parameters of the neural network model, a parameter matrix;

performing block division on the parameter matrix to obtain multiple matrix blocks comprised in the parameter matrix;

determining a mean of parameters in each matrix block at the timing of structure sparsity; and sorting, based on the mean of the parameters in each matrix block, the matrix blocks in ascending order, and resetting parameters in the first multiple matrix blocks in an ascending sort result to obtain a reset parameter matrix;

the reset parameter matrix is used for updating the parameters of the neural network model.

11. The method according to claim 9, wherein before the constructing a loss function for the neural network model, the method further comprises:

acquiring a content text length of the contextual representation of the phoneme sequence sample; and constructing, based on the predicted alignment position and the content text length, a position loss function for the neural network model when the predicted alignment position corresponds to the end position in the contextual representation;

the constructing, based on the predicted frequency spectrum data corresponding to the text sample and frequency spectrum data annotations corresponding to the text sample, a loss function for the neural network model comprises:

constructing, based on the predicted frequency spectrum data corresponding to the text sample and frequency spectrum data annotations corresponding to the text sample, a frequency spectrum loss function for the neural network model; and performing weighted summation on the frequency spectrum loss function and the position loss function to obtain a loss function for the neural network model.

12. The method according to claim 1, wherein the encoding the phoneme sequence to obtain a contextual representation of the phoneme sequence comprises:

performing forward encoding on the phoneme sequence to obtain a forward hidden vector of the phoneme sequence;

performing backward encoding on the phoneme sequence to obtain a backward hidden vector of the phoneme sequence; and fusing the forward hidden vector and the backward hidden vector to obtain a contextual representation of the phoneme sequence.

13. An audio signal generation apparatus, comprising:

a memory, configured to store executable instructions;

a processor, configured, when executing the executable instructions stored in the memory, to perform:

converting a text into a corresponding phoneme sequence;

encoding the phoneme sequence to obtain a contextual representation of the phoneme sequence;

determining, based on a first frame hidden state corresponding to a phoneme in the phoneme sequence, an alignment position of the first frame hidden state relative to the contextual representation;

decoding the contextual representation and the first frame hidden state to obtain a second frame hidden state when the alignment position corresponds to a non-end position in the contextual representation; and synthesizing the first frame hidden state and the second frame hidden state to obtain an audio signal corresponding to the text, wherein the determining, based on the first frame hidden state corresponding to the phoneme, the alignment position of the first frame hidden state relative to the contextual representation comprises: performing Gaussian prediction on the first frame hidden state corresponding to the phoneme to obtain first Gaussian parameters corresponding to the first frame hidden state; and determining, based on the first Gaussian parameters, whether the alignment position of the first frame hidden state relative to the contextual representation corresponds to a non-end position or an end position in the contextual representation, the first Gaussian parameters comprising a first Gaussian mean and a first Gaussian variance, the first Gaussian variance representing a width of an attention window, the first Gaussian variance being less when the phoneme is a silence phoneme representing a pause than when the phoneme is a non-silence phoneme.

14. The apparatus according to claim 13, wherein the first frame hidden state represents a hidden state of the first frame, the second frame hidden state represents a hidden state of the second frame, and the first frame and the second frame are two adjacent frames in frequency spectrum data corresponding to the phoneme;

when the first frame hidden state is recorded as a $t^{th}$ frame hidden state, the determining, based on a first frame hidden state corresponding to a phoneme in the phoneme sequence, an alignment position of the first frame hidden state relative to the contextual representation comprises:

performing the following processing on the phoneme in the phoneme sequence:

determining, based on a $t^{th}$ frame hidden state corresponding to the phoneme, an alignment position of the $t^{th}$ frame hidden state relative to the contextual representation;

the decoding the contextual representation and the first frame hidden state to obtain a second frame hidden state when the alignment position corresponds to a non-end position in the contextual representation comprises:

decoding the contextual representation and the $t^{th}$ frame hidden state to obtain a $(t+1)^{th}$ frame hidden state when the alignment position of the $t^{th}$ frame hidden state relative to the contextual representation corresponds to a non-end position in the contextual representation;

t is a natural number increasing from 1 and satisfies the condition of $1 \le t \le T$, T is the total number of frames corresponding to the phoneme sequence when the alignment position corresponds to the end position in the contextual representation, the total number of frames represents the number of frames of frequency spectrum data corresponding to hidden states of phonemes in the phoneme sequence, and T is a natural number greater than or equal to 1.

15. The apparatus according to claim 14, wherein the synthesizing the first frame hidden state and the second frame hidden state to obtain an audio signal corresponding to the text comprises:

concatenating hidden states of T frames to obtain a hidden state corresponding to the text when the alignment position corresponds to the end position in the contextual representation;

smoothing the hidden state corresponding to the text to obtain frequency spectrum data corresponding to the text; and performing Fourier transform on the frequency spectrum data corresponding to the text to obtain an audio signal corresponding to the text.

16. The apparatus according to claim 14, wherein the determining, based on a $t^{th}$ frame hidden state corresponding to the phoneme, an alignment position of the $t^{th}$ frame hidden state relative to the contextual representation comprises:

performing Gaussian prediction on a $t^{th}$ hidden state corresponding to the phoneme to obtain $t^{th}$ Gaussian parameters corresponding to the $t^{th}$ frame hidden state; and determining, based on the $t^{th}$ Gaussian parameters, an alignment position of the $t^{th}$ frame hidden state relative to the contextual representation.

17. The apparatus according to claim 16, wherein the performing Gaussian prediction on a $t^{th}$ hidden state corresponding to the phoneme to obtain $t^{th}$ Gaussian parameters corresponding to the $t^{th}$ frame hidden state comprises:

performing Gaussian function-based prediction on a $t^{th}$ frame hidden state corresponding to the phoneme to obtain a $t^{th}$ Gaussian variance and a $t^{th}$ Gaussian mean variation corresponding to the $t^{th}$ frame hidden state;

determining $(t-1)^{th}$ Gaussian parameters corresponding to a $(t-1)^{th}$ frame hidden state;

adding a $(t-1)^{th}$ Gaussian mean comprised in the $(t-1)^{th}$ Gaussian parameters and the $t^{th}$ Gaussian mean variation together to obtain a $t^{th}$ Gaussian mean corresponding to the $t^{th}$ frame hidden state; and taking a set of the $t^{th}$ Gaussian variance and the $t^{th}$ Gaussian mean as $t^{th}$ Gaussian parameters corresponding to the $t^{th}$ frame hidden state; and the determining, based on the $t^{th}$ Gaussian parameters, an alignment position of the $t^{th}$ frame hidden state relative to the contextual representation comprises:

taking the $t^{th}$ Gaussian mean as an alignment position of the $t^{th}$ frame hidden state relative to the contextual representation.

18. The apparatus according to claim 17, wherein the processor is further configured to perform:

determining a content text length of the contextual representation of the phoneme sequence;

determining that the alignment position corresponds to the end position in the contextual representation when the $t^{th}$ Gaussian mean is greater than the content text length; and determining that the alignment position corresponds to a non-end position in the contextual representation when the $t^{th}$ Gaussian mean is less than or equal to the content text length.

19. The apparatus according to claim 14, wherein the decoding the contextual representation and the $t^{th}$ frame hidden state to obtain a $(t+1)^{th}$ frame hidden state comprises:

determining an attention weight corresponding to the $t^{th}$ frame hidden state;

weighting, based on the attention weight, the contextual representation to obtain a contextual vector corresponding to the contextual representation; and performing state prediction on the contextual vector and the $t^{th}$ frame hidden state to obtain a $(t+1)^{th}$ frame hidden state.

20. A non-transitory computer-readable storage medium, storing executable instructions, the executable instructions, when executed by a processor, causing the processor to implement:

converting a text into a corresponding phoneme sequence;

encoding the phoneme sequence to obtain a contextual representation of the phoneme sequence;

determining, based on a first frame hidden state corresponding to a phoneme in the phoneme sequence, an alignment position of the first frame hidden state relative to the contextual representation;

decoding the contextual representation and the first frame hidden state to obtain a second frame hidden state when the alignment position corresponds to a non-end position in the contextual representation; and synthesizing the first frame hidden state and the second frame hidden state to obtain an audio signal corresponding to the text, wherein the determining, based on the first frame hidden state corresponding to the phoneme, the alignment position of the first frame hidden state relative to the contextual representation comprises: performing Gaussian prediction on the first frame hidden state corresponding to the phoneme to obtain first Gaussian parameters corresponding to the first frame hidden state; and determining, based on the first Gaussian parameters, whether the alignment position of the first frame hidden state relative to the contextual representation corresponds to a non-end position or an end position in the contextual representation, the first Gaussian parameters comprising a first Gaussian mean and a first Gaussian variance, the first Gaussian variance representing a width of an attention window, the first Gaussian variance being less when the phoneme is a silence phoneme representing a pause than when the phoneme is a non-silence phoneme.

* * * * *